United States Patent
Sim et al.

(10) Patent No.: US 10,754,080 B2
(45) Date of Patent: Aug. 25, 2020

(54) DISPLAY DEVICE INCLUDING A FILTER FOR CHANGING CHARACTERISTICS OF LIGHT

(71) Applicant: LG ELECTRONICS INC., Seoul (KR)

(72) Inventors: Sujin Sim, Seoul (KR); Sangmin Baek, Seoul (KR); Geunhwan Kim, Seoul (KR); Minho Kim, Seoul (KR); Juyoung Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/313,119

(22) PCT Filed: Apr. 10, 2017

(86) PCT No.: PCT/KR2017/003877
§ 371 (c)(1),
(2) Date: Dec. 24, 2018

(87) PCT Pub. No.: WO2017/222156
PCT Pub. Date: Dec. 28, 2017

(65) Prior Publication Data
US 2019/0196088 A1    Jun. 27, 2019

(30) Foreign Application Priority Data
Jun. 24, 2016 (KR) .................. 10-2016-0079529

(51) Int. Cl.
*G02F 1/1335* (2006.01)
*G02B 5/28* (2006.01)
(Continued)

(52) U.S. Cl.
CPC ......... *G02B 6/0026* (2013.01); *G02B 6/0088* (2013.01); *G02B 6/10* (2013.01);
(Continued)

(58) Field of Classification Search
CPC .......... G02B 6/0026; G02B 5/28; G02B 5/22; G02B 19/00; G02F 1/133615; G02F 1/133504
See application file for complete search history.

(56) References Cited

U.S. PATENT DOCUMENTS

| | | | | |
|---|---|---|---|---|
| 2012/0294033 A1* | 11/2012 | Chen | ............... | G02B 6/0031 362/606 |
| 2015/0253625 A1* | 9/2015 | Lee | ............... | G02B 6/0026 349/62 |
| 2015/0338064 A1* | 11/2015 | Ishino | ............... | G02F 1/133615 349/61 |

FOREIGN PATENT DOCUMENTS

| KR | 10-2009-0086410 A | 8/2009 |
|---|---|---|
| KR | 10-2012-0025900 A | 3/2012 |

(Continued)

*Primary Examiner* — Karabi Guharay
(74) *Attorney, Agent, or Firm* — Birch, Stewart, Kolasch & Birch, LLP

(57) ABSTRACT

A display device is disclosed. The display device according to the present disclosure includes a frame; a light assembly disposed in at least one edge area of the frame; a panel positioned in front of the frame; and a light guide plate positioned between the frame and the panel so that light emitted from the light assembly is transferred to the panel, wherein the light assembly includes a light source and a filter positioned at a light path between the light source and the light guide plate and changing characteristics of light emitted from the light source. The present disclosure can improve display quality of the display device by changing characteristics of light emitted from the light source.

16 Claims, 23 Drawing Sheets

(51) Int. Cl.
*G02B 5/22* (2006.01)
*F21V 8/00* (2006.01)
*G02B 6/10* (2006.01)
*G02F 1/13357* (2006.01)
*G02B 5/10* (2006.01)
*G02B 19/00* (2006.01)

(52) U.S. Cl.
CPC ...... *G02F 1/1335* (2013.01); *G02F 1/133504* (2013.01); *G02F 1/133615* (2013.01); *G02B 5/10* (2013.01); *G02B 5/22* (2013.01); *G02B 5/28* (2013.01); *G02B 19/0061* (2013.01)

(56) References Cited

FOREIGN PATENT DOCUMENTS

| | | | |
|---|---|---|---|
| KR | 10-2014-0049655 A | 4/2014 | |
| KR | 10-2016-0045213 A | 4/2016 | |
| KR | 10-2016-0051570 A | 5/2016 | |

\* cited by examiner

[Figure 1]
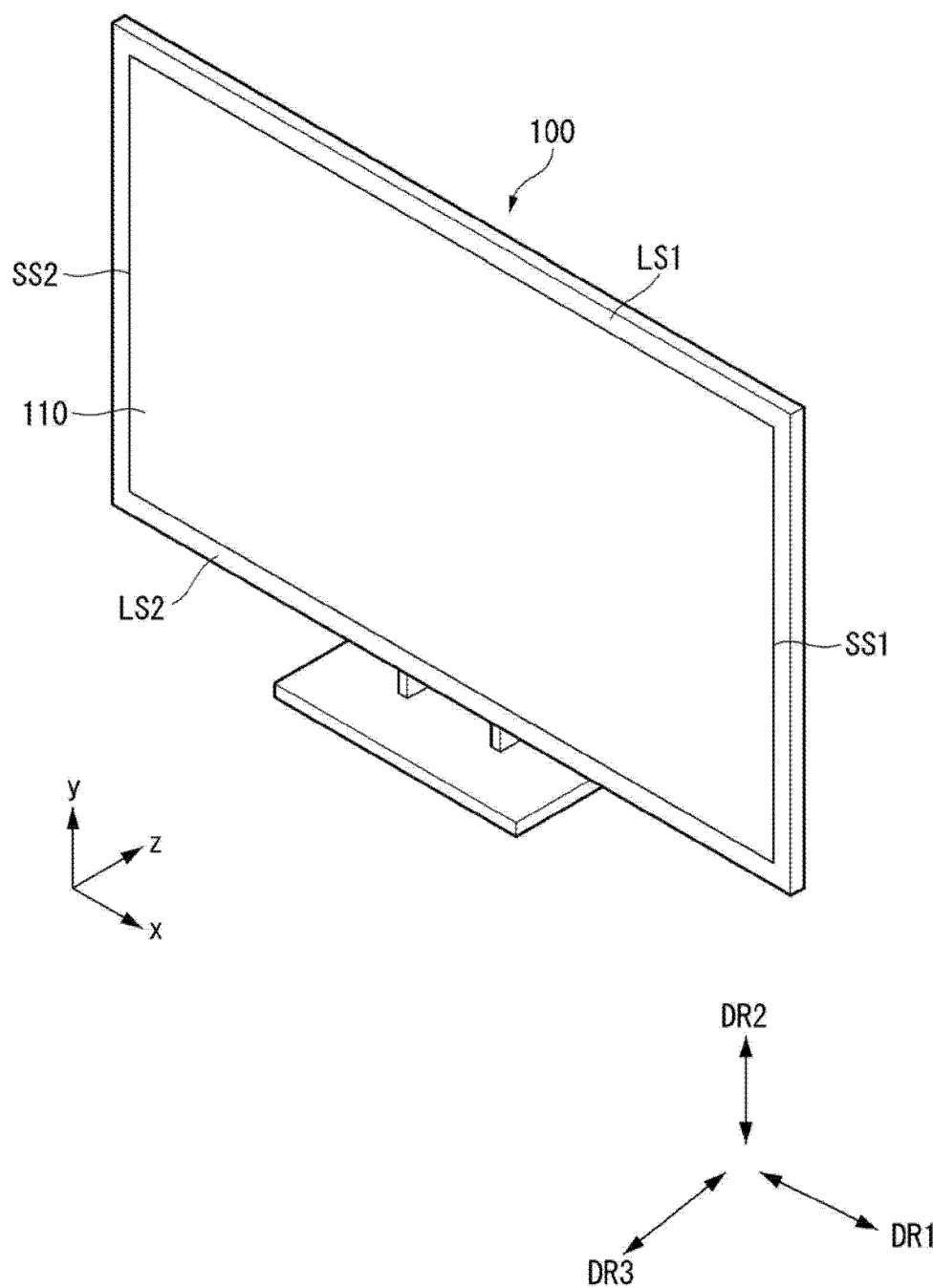

[Figure 2]
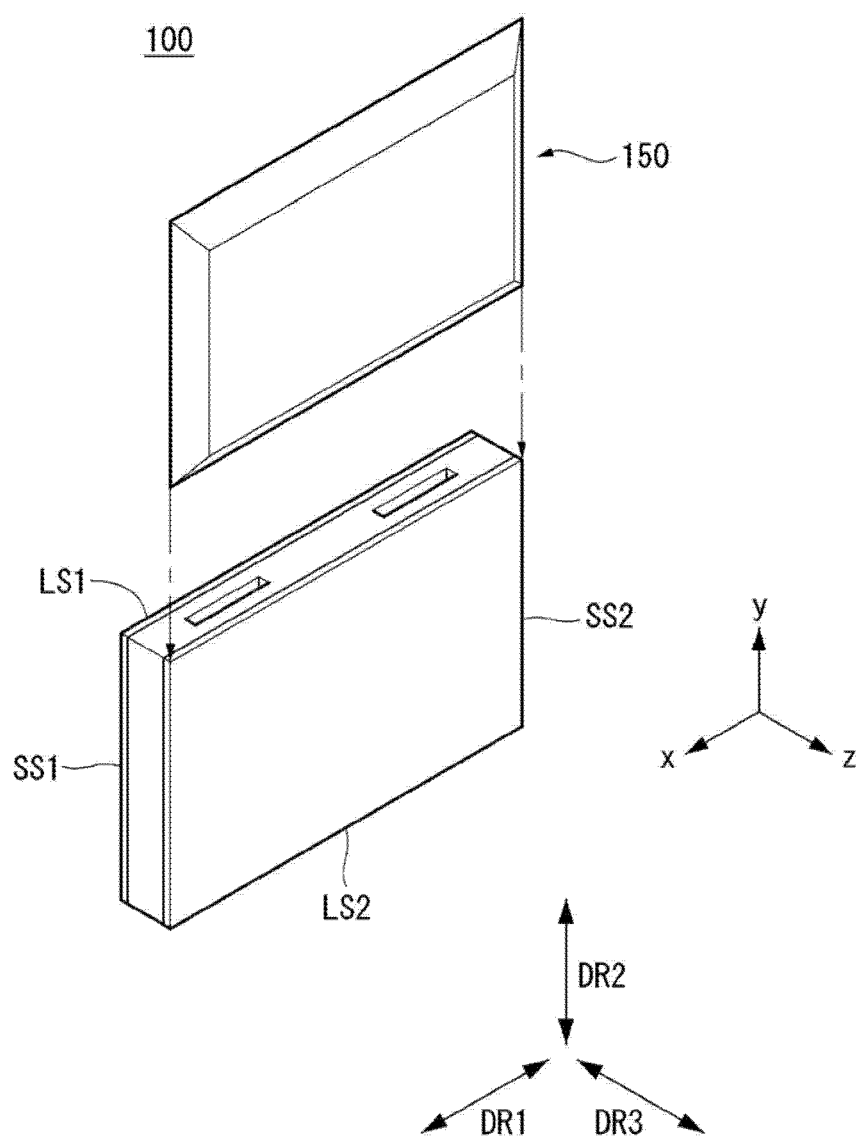

[Figure 3]
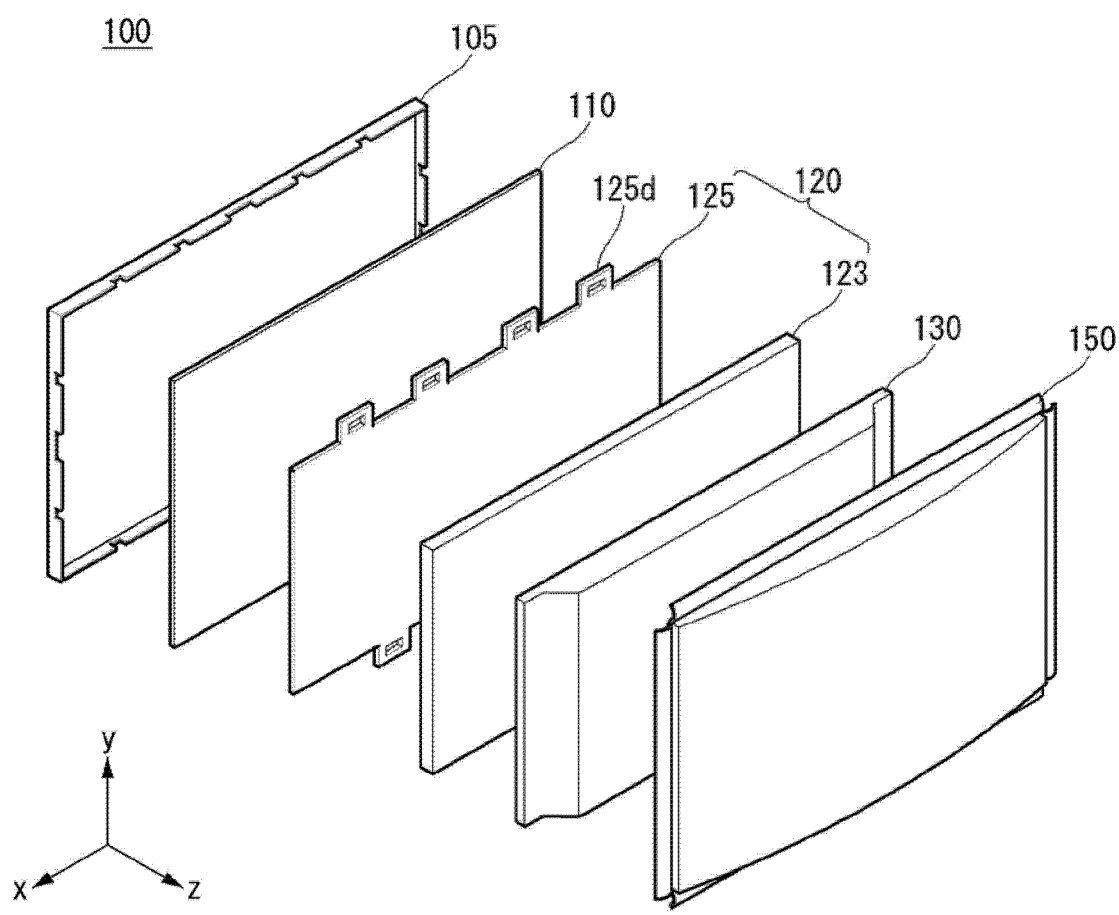

[Figure 4]
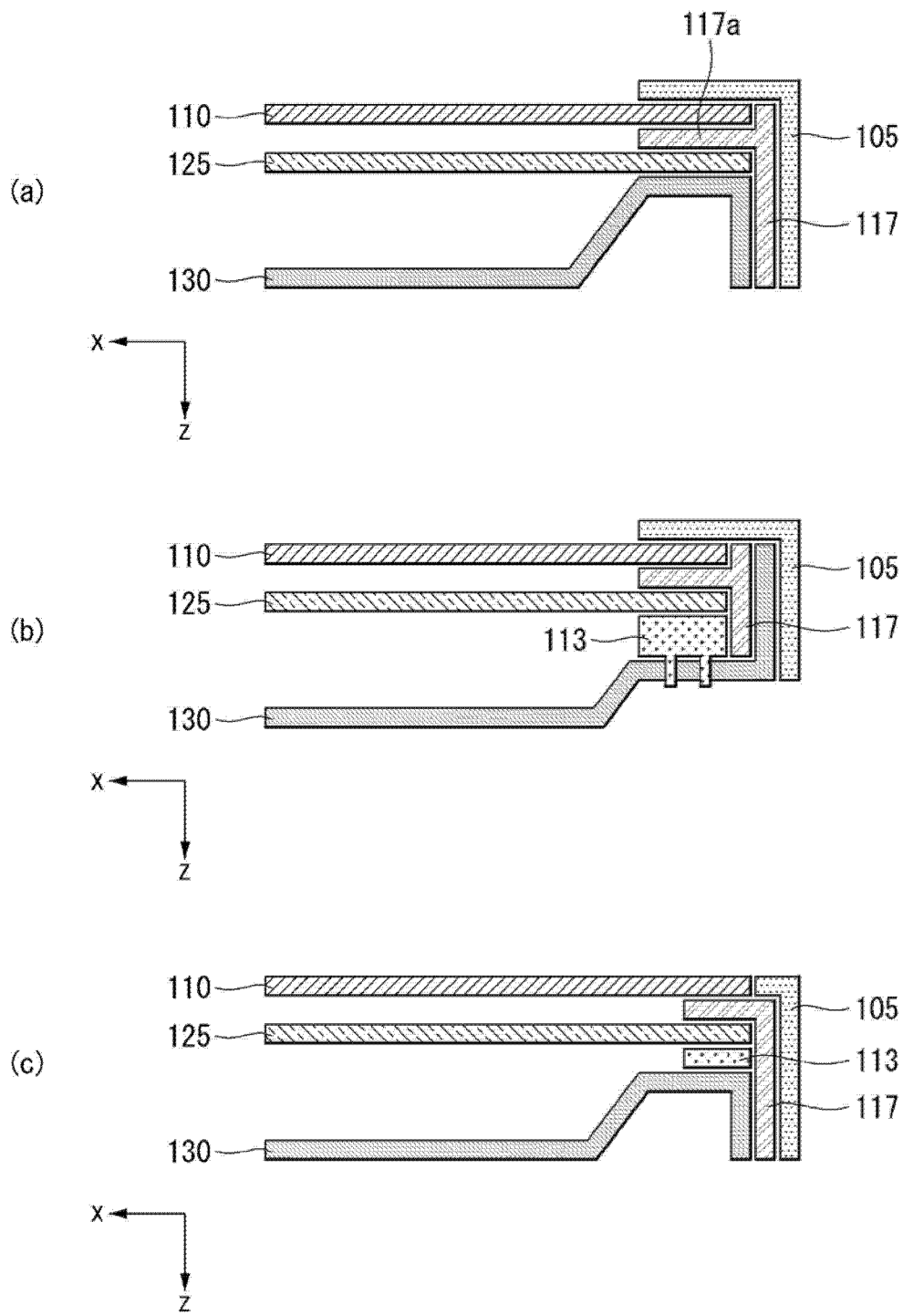

[Figure 5]
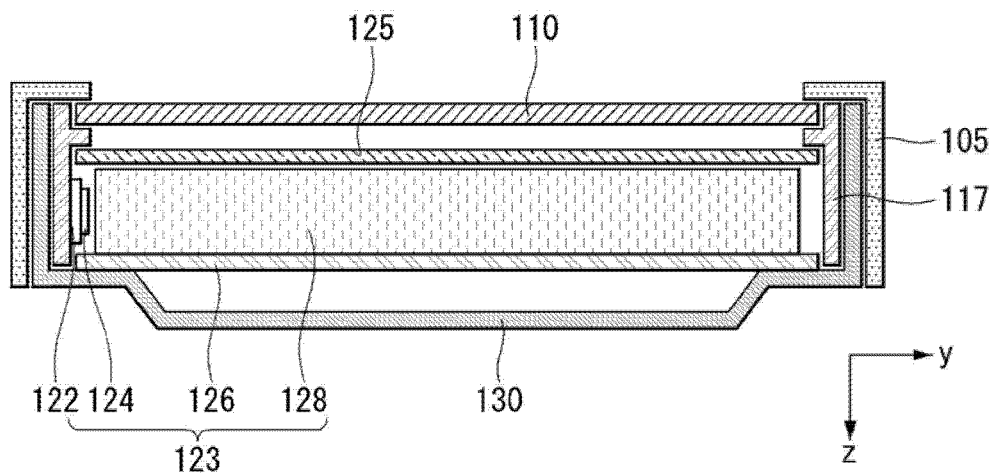
[Figure 6]
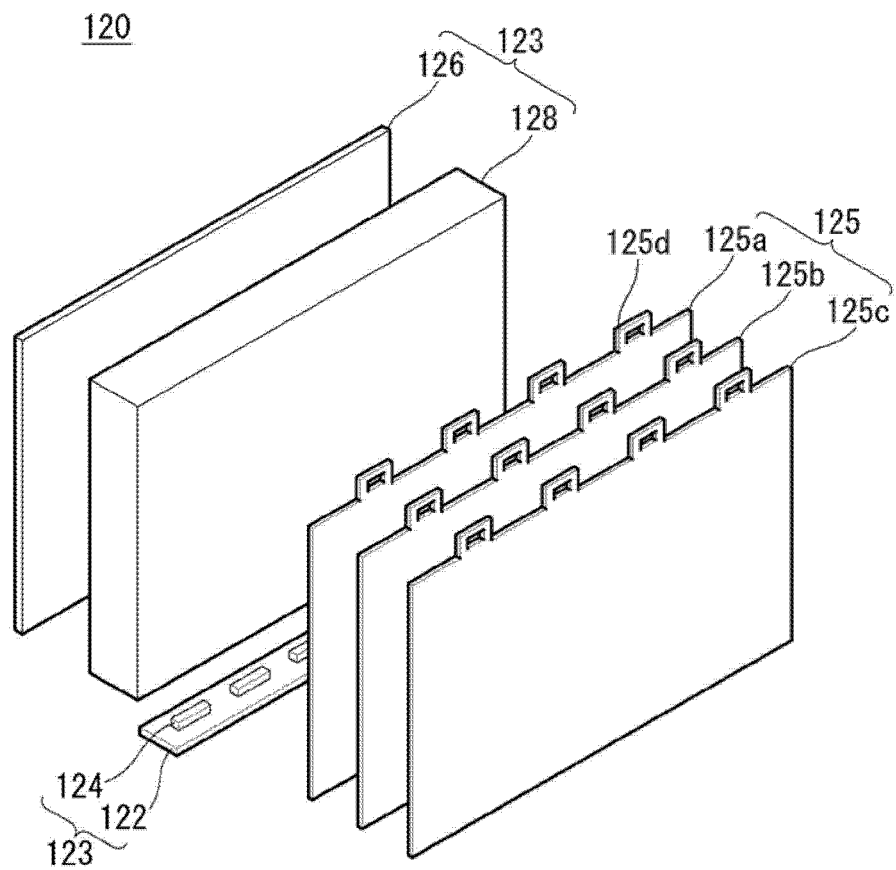

[Figure 7]
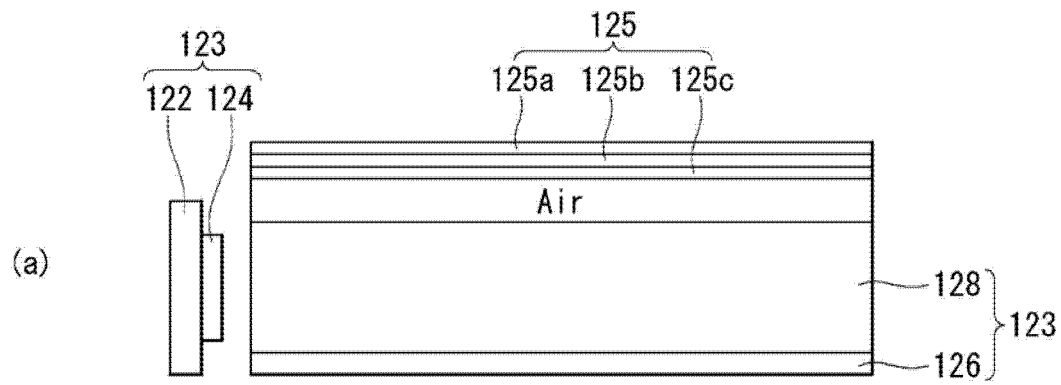
(a)
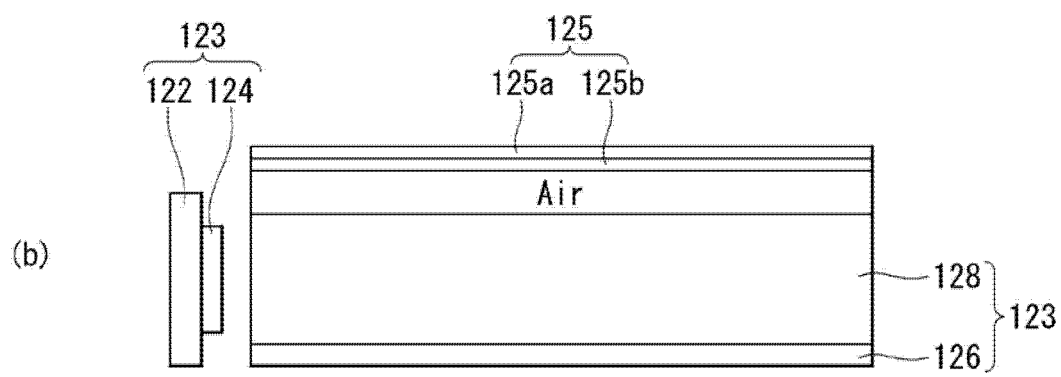
(b)

[Figure 8]
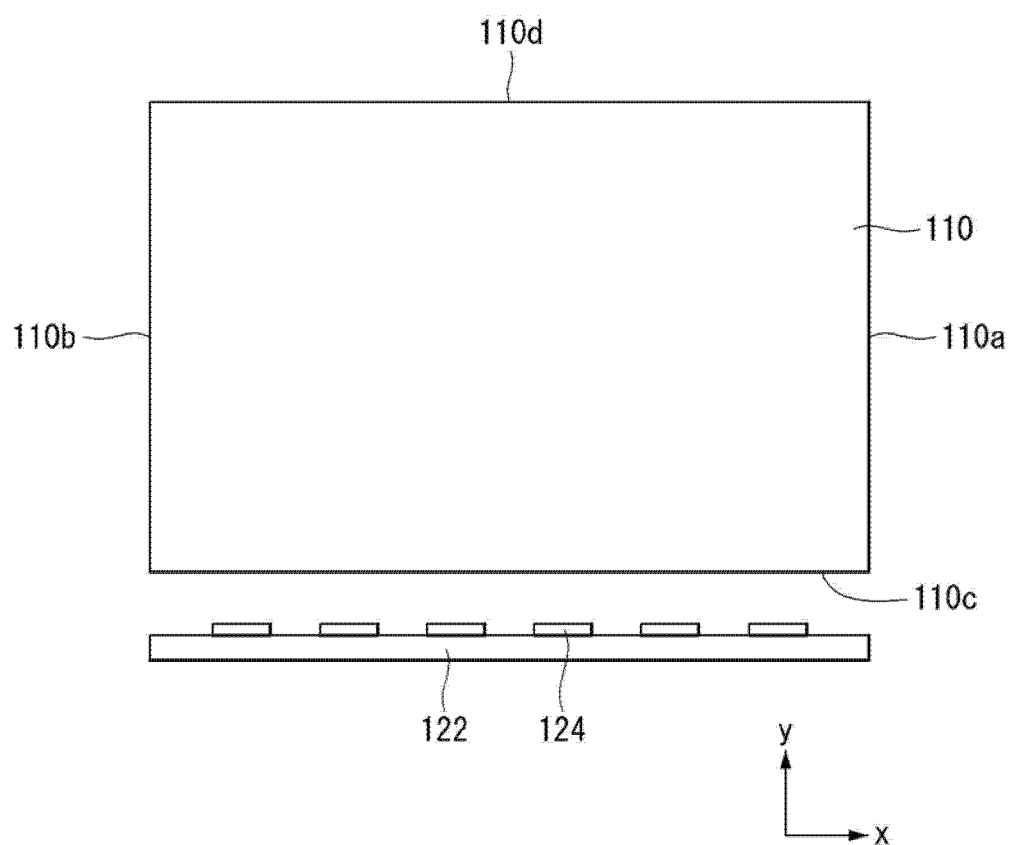

【Figure 9】
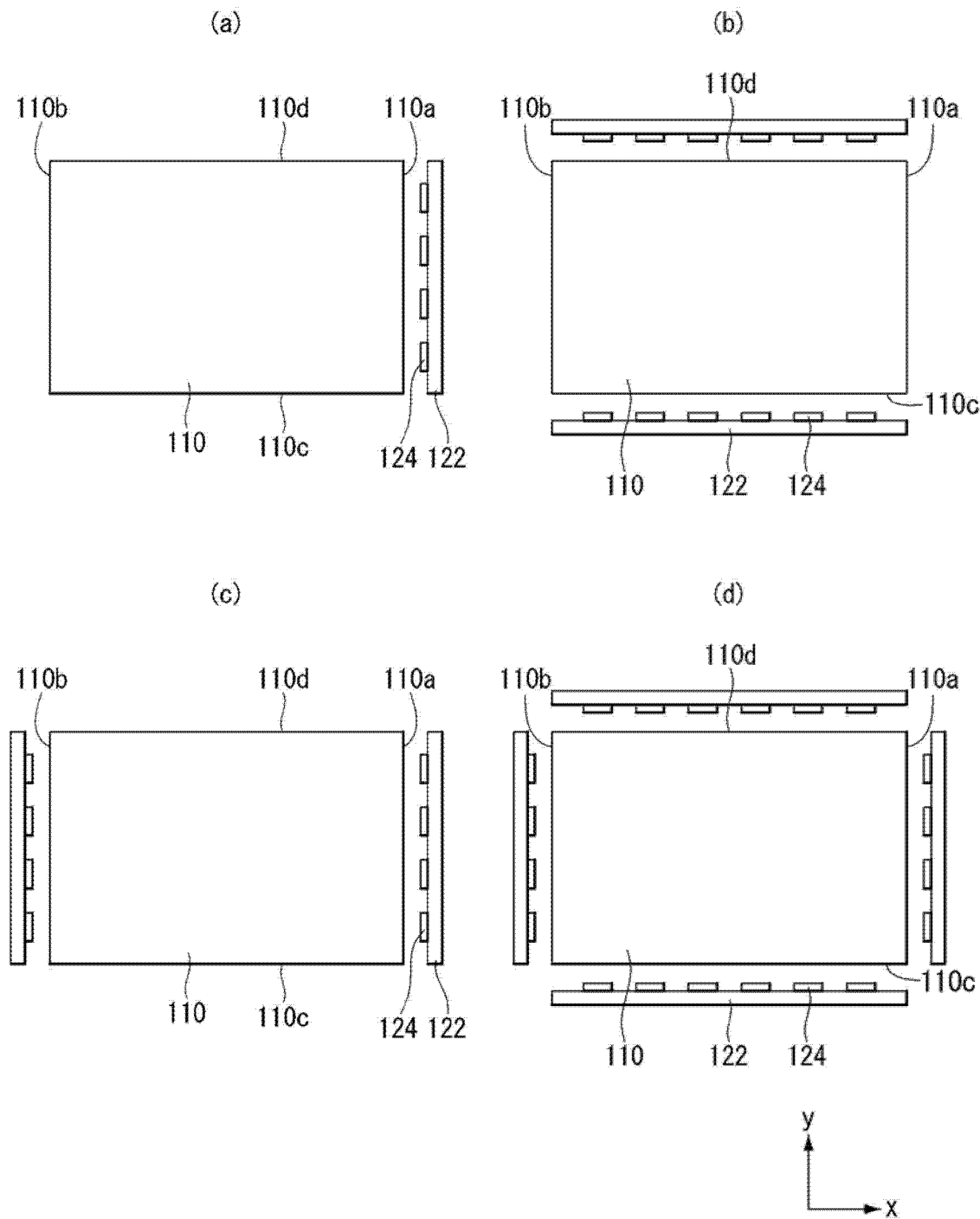

[Figure 10]
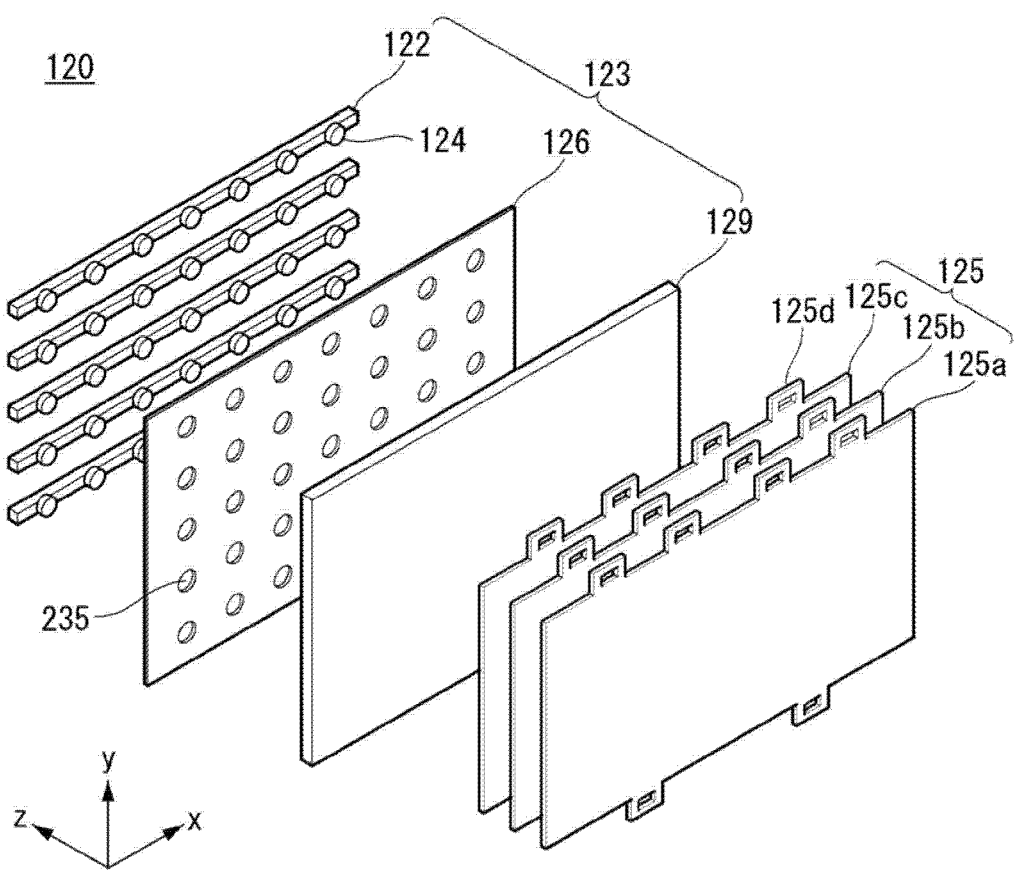

【Figure 11】
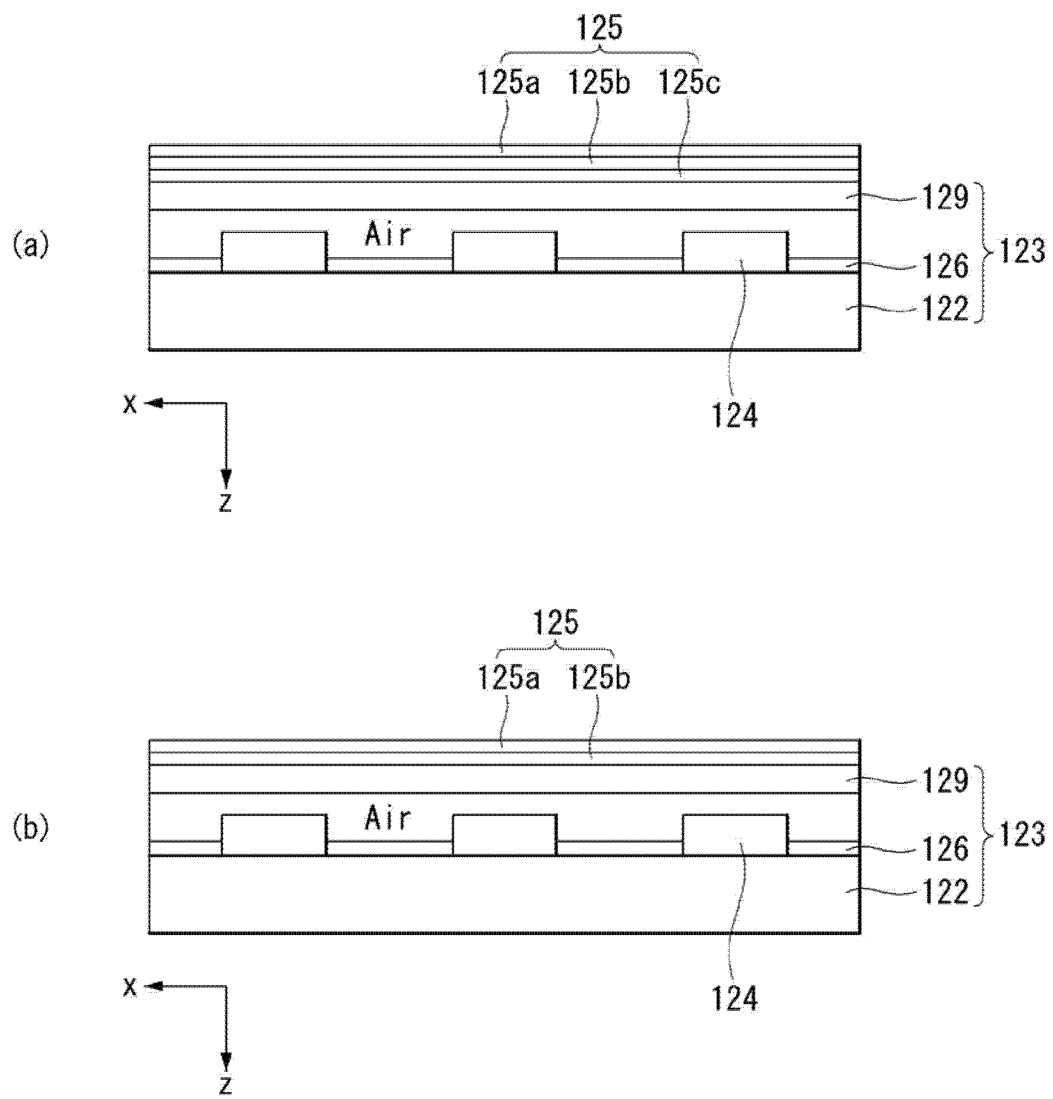

[Figure 12]
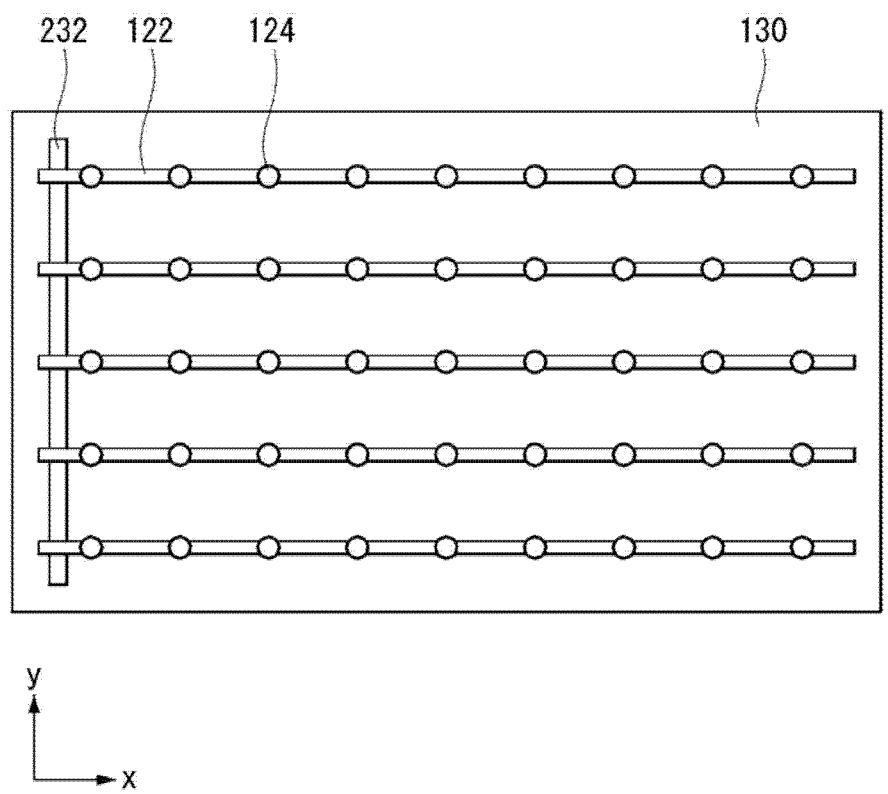

【Figure 13】
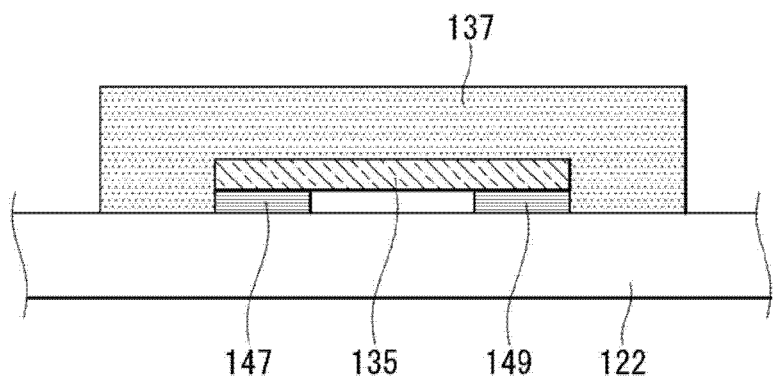
【Figure 14】
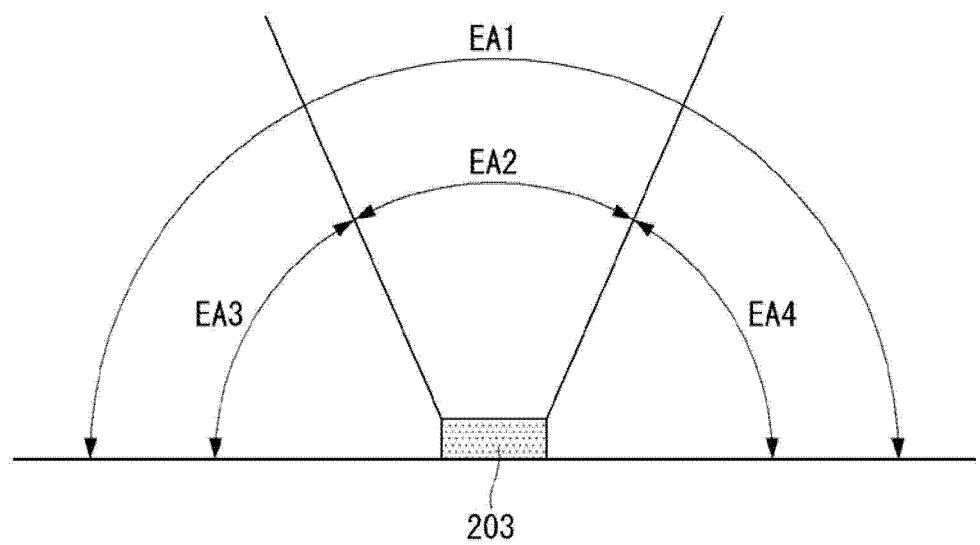

[Figure 15]
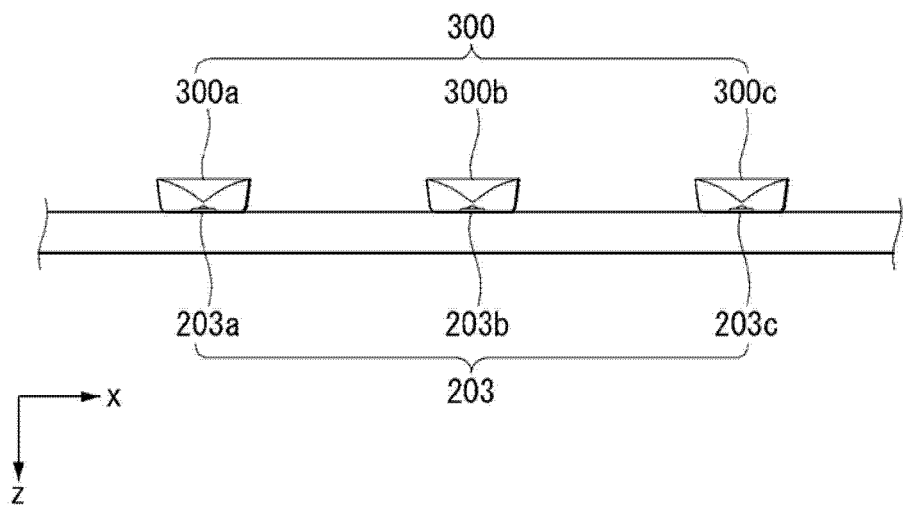
[Figure 16]
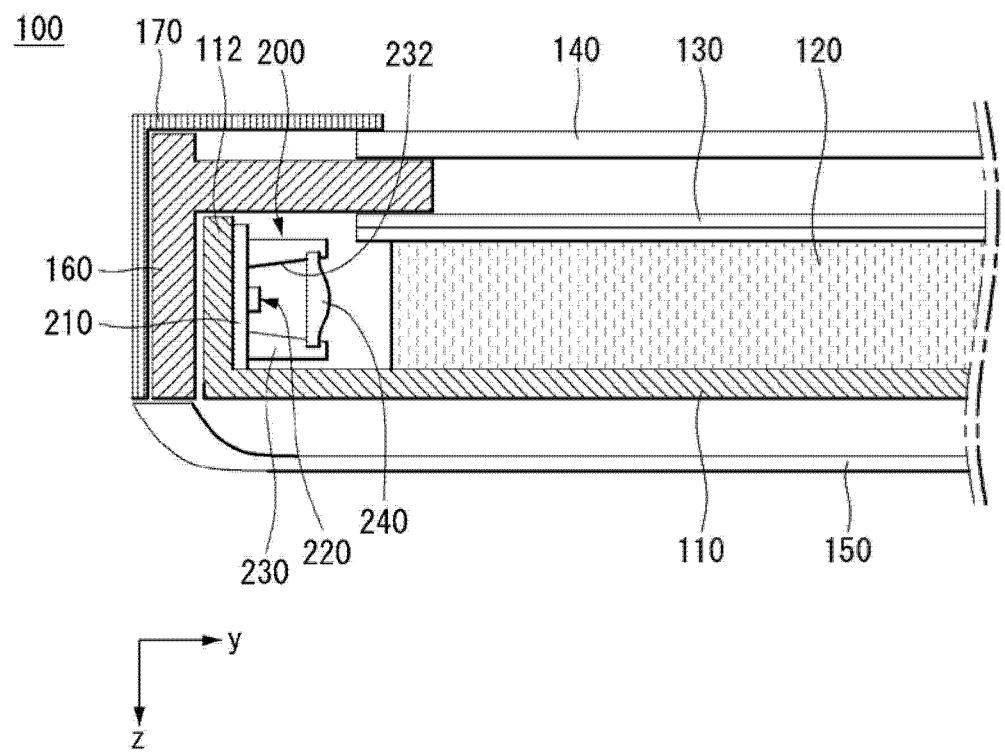

[Figure 17]
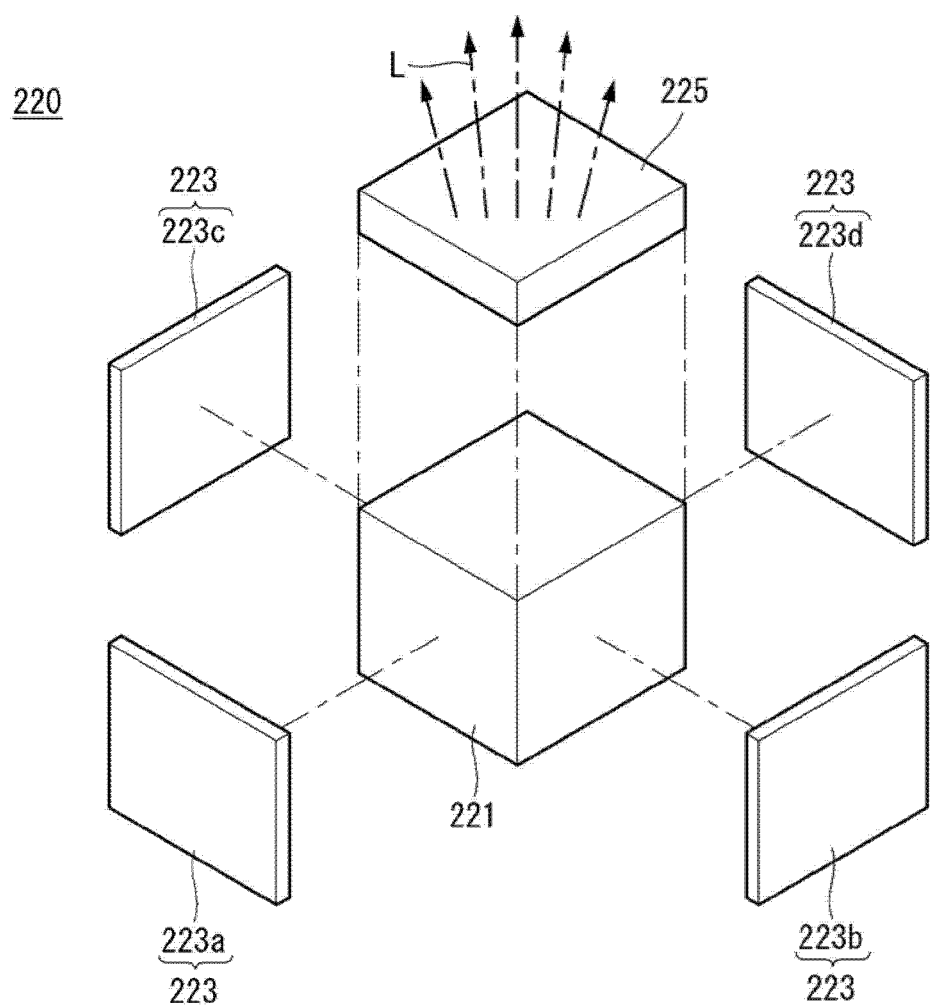

【Figure 18】
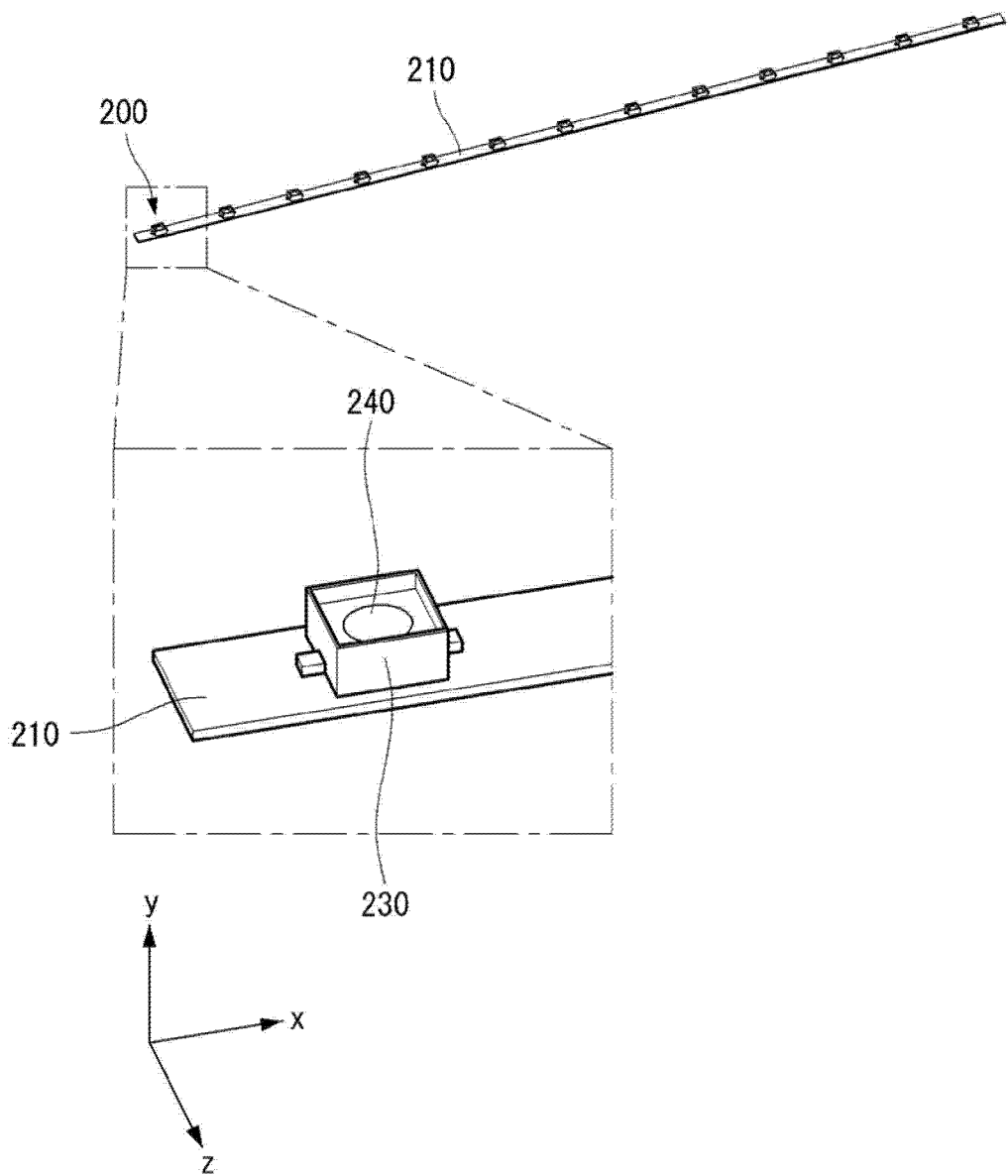

【Figure 19】
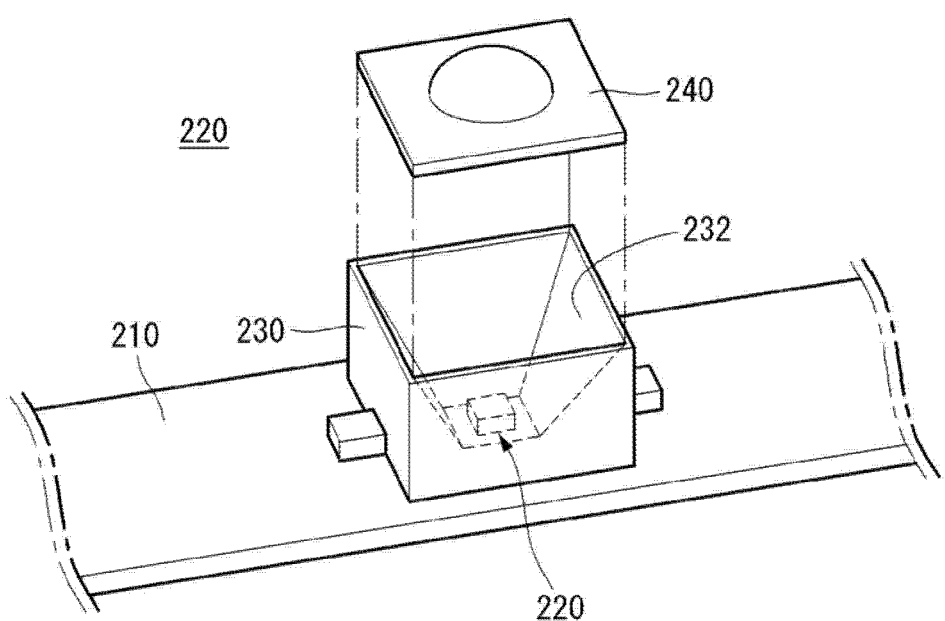

[Figure 20]
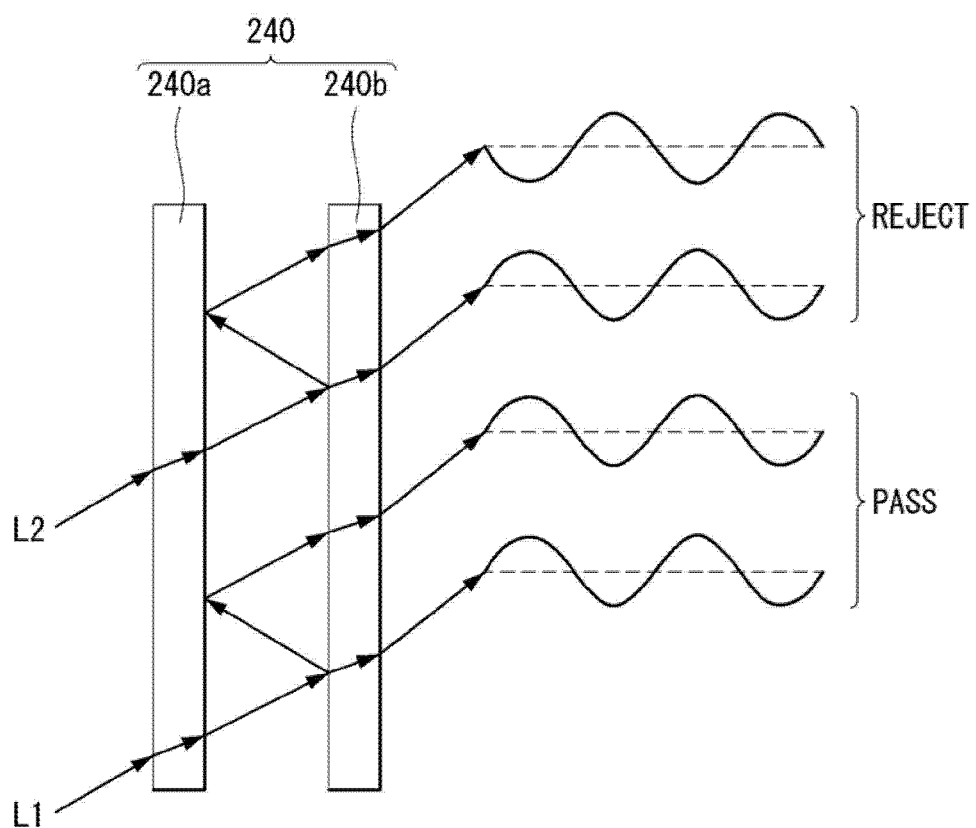

[Figure 21]
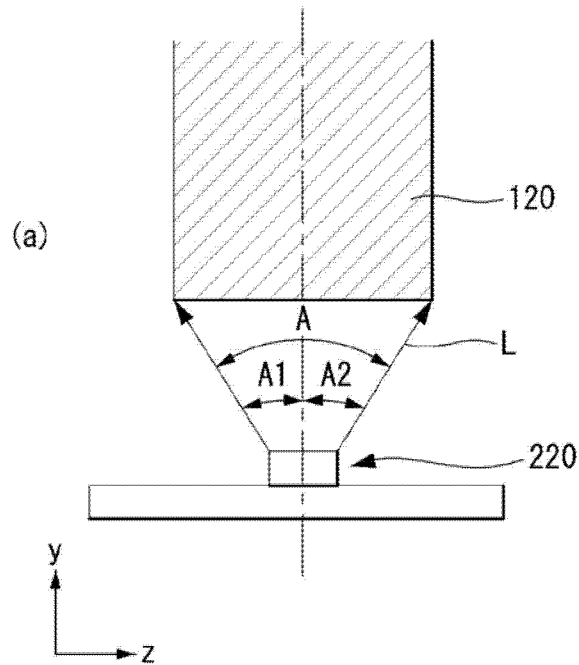
(a)
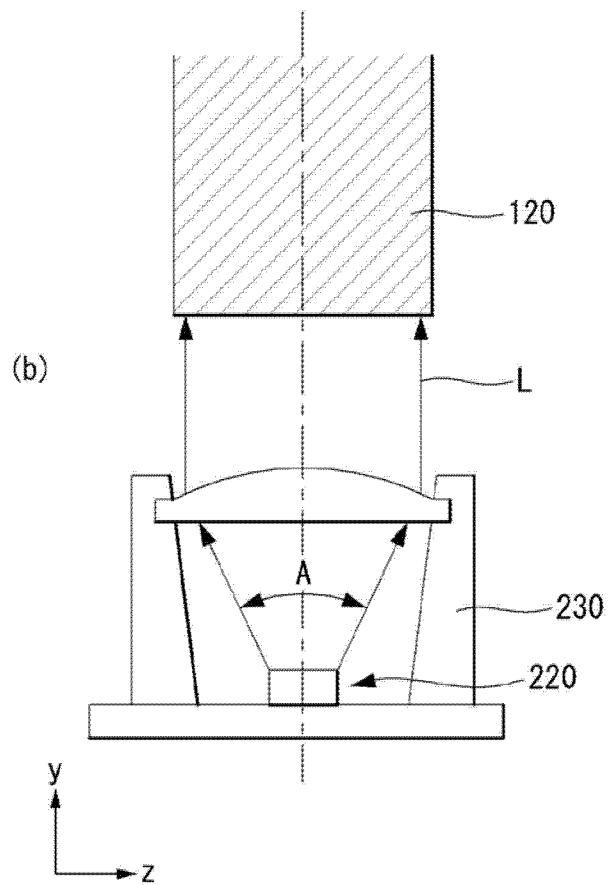
(b)

【Figure 22】
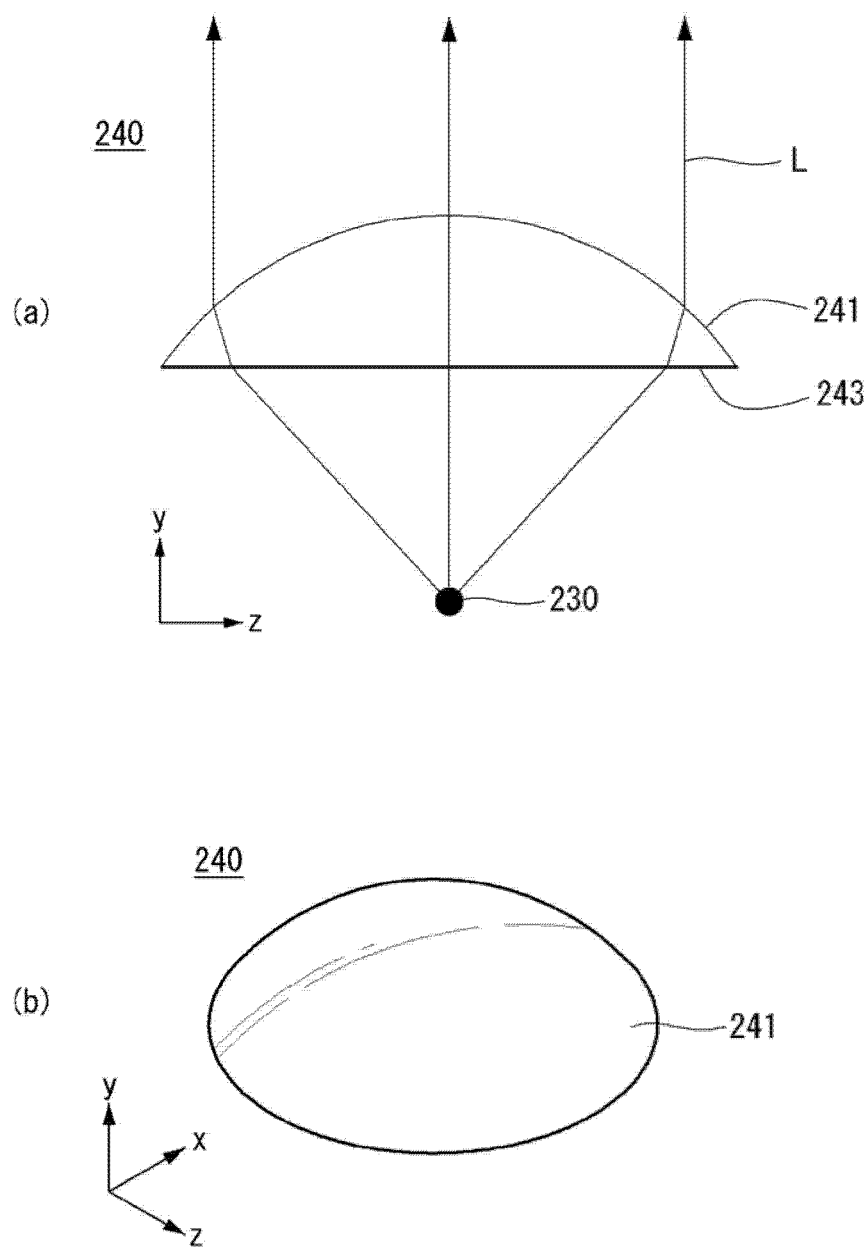

[Figure 23]
(a) 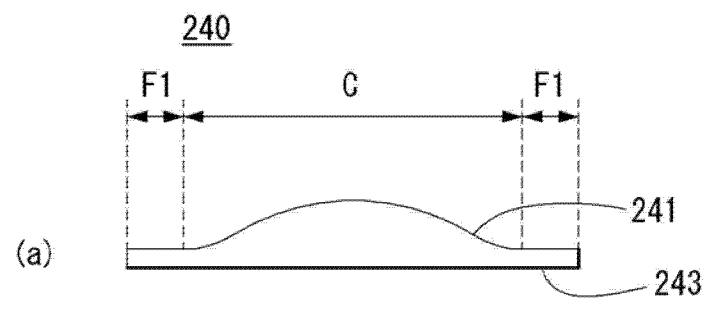
(b) 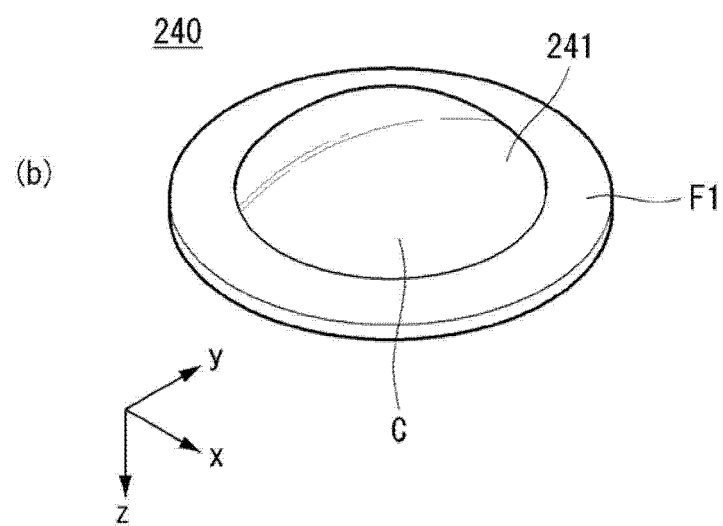

[Figure 24]
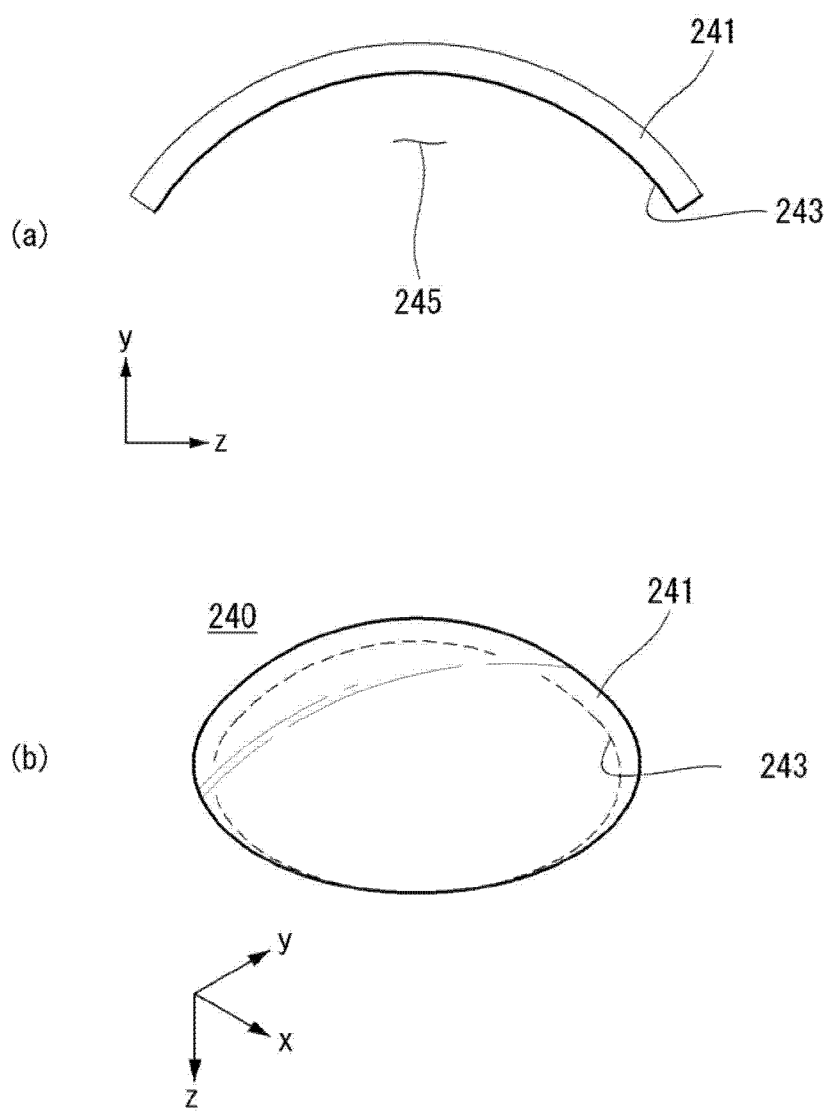

[Figure 25]
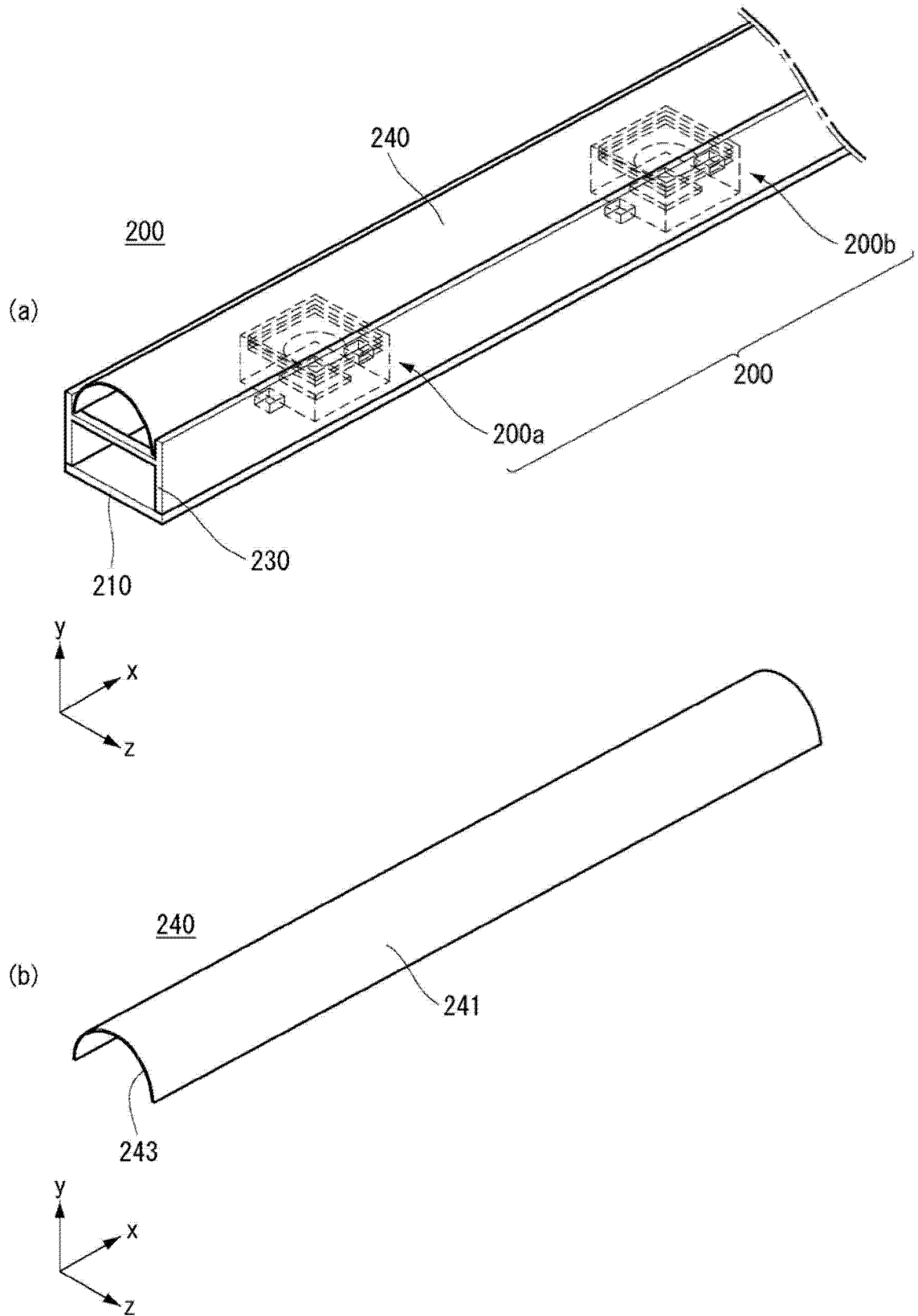

[Figure 26]
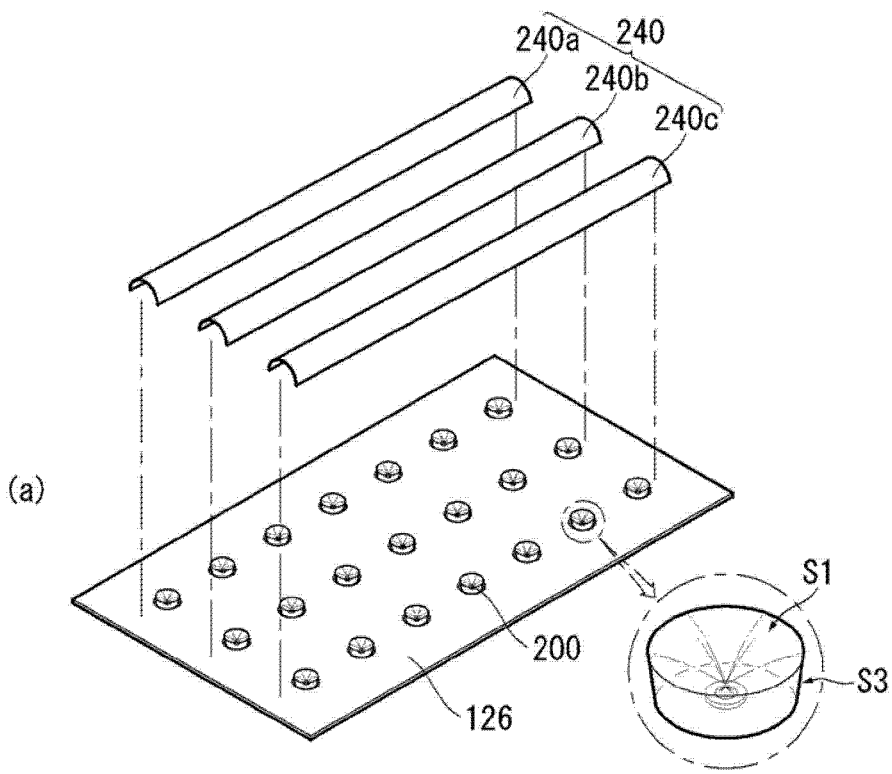
(a)
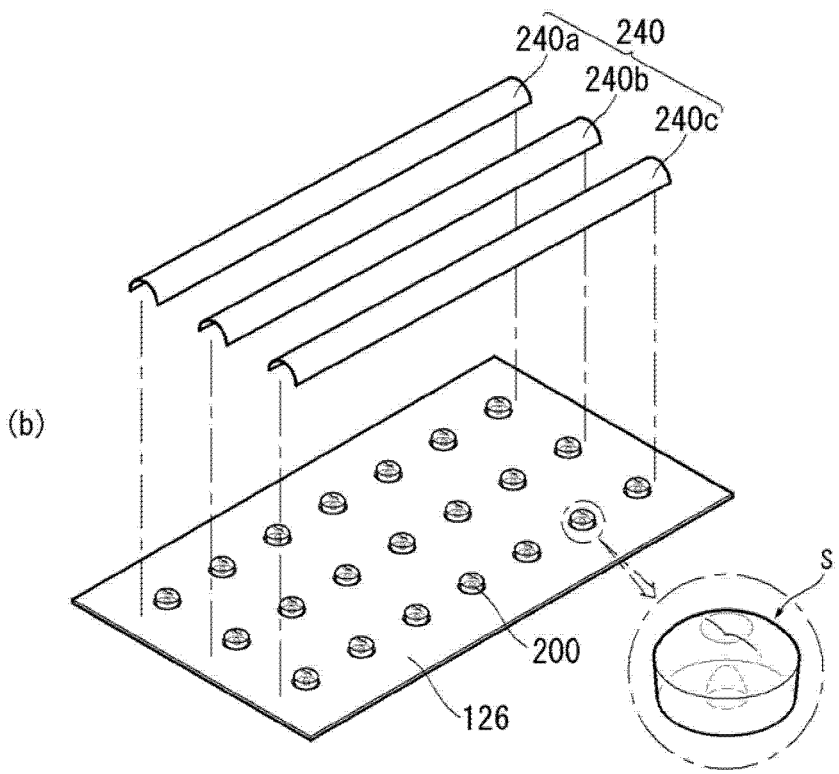
(b)

DISPLAY DEVICE INCLUDING A FILTER FOR CHANGING CHARACTERISTICS OF LIGHT

CROSS-REFERENCE TO RELATED APPLICATIONS

This application is the National Phase of PCT International Application No. PCT/KR2017/003877, filed on Apr. 10, 2017, which claims priority under 35 U.S.C. 119(a) to Patent Application No. 10-2016-0079529, filed in Korea on Jun. 24, 2016, all of which are hereby expressly incorporated by reference into the present application.

BACKGROUND OF THE INVENTION

Field of the Invention

The present disclosure relates to a display device.

Discussion of the Related Art

With the development of the information society, various demands for display devices are increasing. Various display devices, such as liquid crystal displays (LCDs), plasma display panels (PDPs), electroluminescent displays (ELDs), and vacuum fluorescent displays (VFDs), have been recently studied and used in response to the various demands for the display devices.

Among the display devices, a liquid crystal panel of the LCD includes a liquid crystal layer and a TFT substrate and a color filter substrate that are positioned opposite each other with the liquid crystal layer interposed therebetween. The liquid crystal panel can display an image using light provided by a backlight unit.

Light provided by the backlight unit needs to be uniform. Namely, it means that no color difference should be generated in light from the backlight unit in order to display a uniform image, and there is a need for improvement in a related structure, etc.

SUMMARY OF THE INVENTION

An object of the present disclosure is to address the above-described and other problems. Another object of the present disclosure is to provide a display device with improved display quality by changing characteristics of light emitted from a light source.

In order to achieve the above-described and other objects, in one aspect, there is provided a display device comprising a display panel; a light guide plate positioned in a rear of the display panel; a frame positioned in a rear of the display panel; and a light assembly disposed on at least one side of the light guide plate, wherein the light assembly includes a light source, and a filter positioned at a light path between the light source and the light guide plate and changing characteristics of light emitted from the light source.

A curved surface may be formed on at least a portion of the filter.

The curved surface may include a curved surface of a shape in which an outer surface adjacent to the light guide plate in an outer surface of the filter is convex toward the light guide plate.

The filter may include a curved surface of a shape in which an outer surface adjacent to the light guide plate in an outer surface of the filter is convex toward the light guide plate, and a flat surface formed on an outer surface adjacent to the light source in the outer surface of the filter.

The filter may change characteristics of light that passes through the filter and is incident on the light guide plate, so that a path of the light is perpendicular to an incident surface of the light guide plate.

The light source may be disposed such that a plurality of light sources is spaced apart from one another, and the filter may be positioned on an area corresponding to at least two of the plurality of light sources.

The filter may be configured such that a plurality of layers is stacked.

The filter may be a band pass filter (BPF) selectively transmitting light of a specific wavelength.

The light source may include a fluorescent substance positioned on a path on which light emitted from the light source is incident on the filter.

The light source may further include a barrier layer that is positioned on a side of the light source and reflects the light in a direction of the fluorescent substance.

In order to achieve the above-described and other objects, in another aspect, there is provided a display device comprising a display panel; a backlight unit positioned in a rear of the display panel; and a frame positioned in a rear of the backlight unit, wherein the backlight unit includes a reflective sheet, and a light assembly providing light for the display panel through a plurality of coupling holes formed in the reflective sheet, wherein the light assembly includes a light source, and a filter positioned on a light path between the light source and the display panel and changing characteristics of light emitted from the light source.

A curved surface may be formed on at least a portion of the filter.

The curved surface may include a curved surface of a shape in which an outer surface adjacent to the display panel in an outer surface of the filter is convex toward the display panel.

The filter may include a curved surface of a shape in which an outer surface adjacent to the display panel in an outer surface of the filter is convex toward the display panel, and a flat surface formed on an outer surface adjacent to the light source in the outer surface of the filter.

The filter may change characteristics of light that passes through the filter and is incident on the display panel, so that a path of the light is perpendicular to an incident surface of the display panel.

The light source may be disposed such that a plurality of light sources is spaced apart from one another, and the filter may be positioned on an area corresponding to at least two of the plurality of light sources.

The filter may be configured such that a plurality of layers is stacked.

The filter may be a band pass filter (BPF) selectively transmitting light of a specific wavelength.

The light source may include a fluorescent substance positioned on a path on which light emitted from the light source is incident on the filter.

The light source may further include a barrier layer that is positioned on a side of the light source and reflects the light in a direction of the fluorescent substance.

Advantageous Effects

Effects of a backlight unit and a display device using the backlight unit according to the present disclosure are described as follows.

According to at least one aspect of the present disclosure, the present disclosure can improve display quality of a display device by changing characteristics of light emitted from a light source.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

FIGS. 1 and 2 illustrate a display device according to an embodiment of the disclosure.

FIGS. 3 to 9 illustrate configuration of a display device related to the present disclosure.

FIGS. 10 to 15 illustrate configuration of a display device according to another embodiment of the disclosure.

FIG. 16 illustrates a display device according to an embodiment of the disclosure.

FIG. 17 illustrates a structure of a light source shown in FIG. 16.

FIGS. 18 to 21 illustrate configuration and operation of a light assembly shown in FIG. 16.

FIGS. 22 to 25 illustrate a filter shown in FIG. 16.

FIG. 26 illustrates a display device according to another embodiment of the disclosure.

DETAILED DESCRIPTION OF THE EMBODIMENTS

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the specification, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features, and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, embodiments of the disclosure are described using a liquid crystal display (LCD) panel as an example of a display panel. However, embodiments of the disclosure are not limited thereto. For example, a plasma display panel (PDP), a field emission display (FED) panel, and an organic light emitting diode (OLED) display panel may be used.

In the following description, a display panel 420 may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be called a first side area, the second short side SS2 may be called a second side area opposite the first side area, the first long side LS1 may be called a third side area that is adjacent to the first side area and the second side area and is positioned between the first side area and the second side area, and the second long side LS2 may be called a fourth side area that is adjacent to the first side area and the second side area, is positioned between the first side area and the second side area, and is opposite to the third side area.

Embodiments of the disclosure describe that lengths of the first and second long sides LS1 and LS2 are longer than lengths of the first and second short sides SS1 and SS2, for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel 100, and a second direction DR2 may be a direction parallel to the short sides SS1 and SS2 of the display panel 100.

A third direction DR3 may be a direction vertical to the first direction DR1 and/or the second direction DR2.

The first direction DR1 and the second direction DR2 may be commonly referred to as a horizontal direction.

Further, the third direction DR3 may be referred to as a vertical direction.

FIGS. 1 and 2 illustrate a display device according to an embodiment of the disclosure.

As shown in FIGS. 1 and 2, a display device 100 according to an embodiment of the disclosure may include a display panel 110 and a back cover 150 in the rear of the display panel 110.

The back cover 150 may be coupled to the display panel 110 while sliding in a direction, i.e., the second direction DR2 from the first long side LS1 to the second long side LS2. In other words, the back cover 150 may be inserted into the display panel 110 while sliding from a first short side SS1, a second short side SS2 opposite the first short side SS1, and a first long side LS1 that is adjacent to the first and second short sides SS1 and SS2 and is positioned between the first short side SS1 and the second short side SS2, in the display panel 110.

The back cover 150 and/or other components adjacent to the back cover 150 may include a protrusion, a sliding part, a coupling part, etc., so that the back cover 150 is connected to the display panel 110 in the sliding manner.

FIGS. 3 to 7 illustrate configuration of a display device related to the present disclosure.

As shown in FIG. 3, the display device 100 according to the embodiment of the disclosure may include a front cover 105, the display panel 110, a backlight unit 120, a bottom cover 130, and the back cover 150.

The front cover 105 may cover at least a portion of a front surface and a side surface of the display panel 110. The front cover 105 may have a rectangular frame shape, in which a center portion is empty. Because the center portion of the front cover 105 is empty, an image on the display panel 110 may be displayed to the outside.

The front cover 105 may be divided into a front part and a side part. Namely, the front cover 105 may include the front part positioned at the front surface of the display panel 110 and the side part positioned at the side surface of the display panel 110. The front part and the side part may be separately configured. One of the front part and the side part may be omitted. For example, for the purpose of a beautiful design, the front part may be omitted and only the side part may be present.

The display panel 110 may be provided in front of the display device 100 and may display an image. The display panel 110 may divide an image into a plurality of pixels and may output the image while controlling color, brightness, and chroma of each pixel. The display panel 110 may be divided into an active area, on which the image is displayed, and an inactive area, on which the image is not displayed. The display panel 110 may include a front substrate and a rear substrate that are positioned opposite each other with a liquid crystal layer interposed therebetween.

The front substrate may include a plurality of pixels each including red (R), green (G), and blue (B) subpixels. The front substrate may generate an image corresponding to red, green, or blue color in response to a control signal.

The rear substrate may include switching elements. The rear substrate may switch on or off pixel electrodes. For example, the pixel electrodes may change a molecule arrangement of the liquid crystal layer in response to a control signal received from the outside. The liquid crystal layer may include a plurality of liquid crystal molecules. The arrangement of the liquid crystal molecules may be changed depending on a voltage difference between the pixel electrode and a common electrode. The liquid crystal layer may transmit light provided by the backlight unit 120 to the front substrate.

The backlight unit 120 may be positioned at a rear surface of the display panel 110. The backlight unit 120 may include a plurality of light sources. The light sources of the backlight unit 120 may be arranged in an edge type or a direct type. In case of the direct type backlight unit 120, a diffusion plate may be further included.

The backlight unit 120 may be coupled to a front surface and a side surface of the bottom cover 130. For example, the plurality of light sources may be disposed inside one side of the bottom cover 130. In this instance, the backlight unit 120 may be commonly called an edge type backlight unit.

The backlight unit 120 may be driven in an entire driving method or a partial driving method, such as a local dimming method and an impulsive driving method. The backlight unit 120 may include an optical sheet 125 and an optical layer 123.

The optical sheet 125 enables light of the light sources to be uniformly transmitted to the display panel 110. The optical sheet 125 may include a plurality of layers. For example, the optical sheet 125 may include at least one prism sheet and/or at least one diffusion sheet.

The optical sheet 125 may further include at least one coupling part 125d. The coupling part 125d may be coupled to the front cover 105 and/or the back cover 150. Namely, the coupling part 125d may be directly coupled to the front cover 105 and/or the back cover 150. Alternatively, the coupling part 125d may be coupled to a structure coupled on the front cover 105 and/or the back cover 150. Namely, the coupling part 125d may be indirectly coupled to the front cover 105 and/or the back cover 150.

The optical layer 123 may include the light source, etc. The detailed configuration of the optical layer 123 will be described in the corresponding paragraphs.

The bottom cover 130 may function to support components constituting the display device 100. For example, configuration such as the backlight unit 120 may be coupled to the bottom cover 130. The bottom cover 130 may be formed of a metal material, for example, an aluminum alloy. The bottom cover 130 may also be called a frame.

The back cover 150 may be positioned at a rear surface of the display device 100. The back cover 150 may protect an internal configuration of the display device 100 from the outside. At least a portion of the back cover 150 may be coupled to the bottom cover 130 and/or the front cover 105. The back cover 150 may be an injection of a resin material.

FIGS. 4 and 5 illustrate configuration of the optical sheet 125.

As shown in (a) of FIG. 4, the optical sheet 125 may be positioned on the bottom cover 130. The optical sheet 125 may be coupled to the bottom cover 130 at an edge of the bottom cover 130. The optical sheet 125 may be directly placed at the edge of the bottom cover 130. Namely, the optical sheet 125 may be supported by the bottom cover 130. An upper surface of an edge of the reflective sheet 125 may be surrounded by a first guide panel 117. For example, the optical sheet 125 may be positioned between the edge of the bottom cover 130 and a flange 117a of the first guide panel 117.

The display panel 110 may be positioned at a front surface of the optical sheet 125. An edge of the display panel 110 may be coupled to the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to an embodiment of the disclosure may further include a second guide panel 113. The optical sheet 125 may be coupled to the second guide panel 113. Namely, the display device 100 may be configured such that the second guide panel 113 is coupled to the bottom cover 130, and the optical sheet 125 is coupled to the second guide panel 113. The second guide panel 113 may be formed of a material different from the bottom cover 130. The bottom cover 130 may have a shape surrounding the first and second guide panels 117 and 113.

As shown in (c) of FIG. 4, in the display device 100 according to an embodiment of the disclosure, the front cover 105 may not cover the front surface of the display panel 110. Namely, one end of the front cover 105 may be positioned on the side surface of the display panel 110.

As shown in FIG. 5, the optical layer 123 may include a substrate 122, a reflective sheet 126, a light assembly 124, and a light guide plate 128.

The optical layer 123 may be positioned on the bottom cover 130. For example, the optical layer 123 may be positioned between the bottom cover 130 and the optical sheet 125. The optical layer 123 may be supported by the bottom cover 130.

The substrate 122 may be positioned on at least one side inside the bottom cover 130. The substrate 122 may be coupled to the first guide panel 117. The substrate 122 may be directly coupled to the first guide panel 117. For example, the substrate 122 may be configured to be coupled to at least one of the first guide panel 117, the bottom cover 130, and the top case 105.

The substrate 122 may be positioned in a lateral direction of the reflective sheet 126 and/or the light guide plate 128. Namely, it means that a front surface of the substrate 122 may be directed toward the optical layer 123. The substrate 122 and the reflective sheet 126 and/or the light guide plate 128 may be spaced apart from each other by a predetermined distance. The detailed configuration of the substrate 122 and the optical layer 123 will be described in corresponding paragraphs.

Referring to FIGS. 6 and 7, the backlight unit 120 may include the optical layer 123 including a substrate 122, at least one light assembly 124, a reflective sheet 126, and a light guide plate 128, and the optical sheet 125 positioned at a front surface of the optical layer 123.

The substrate 122 may be positioned on at least one side of another configuration of the optical layer 123. The substrate 122 may be extended in a direction perpendicular to a longitudinal direction of another configuration of the optical layer 123.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB) on which at least one light assembly 124 is mounted.

The light assembly 124 may be disposed on the substrate 122 at predetermined intervals. A width of the light assembly 124 in a longitudinal direction may be less than a width of the light guide plate 128 in a thickness direction. Thus, most of light emitted from the light assembly 124 may be transferred to the inside of the light guide plate 128.

The light assembly 124 may be a light emitting diode (LED) chip or a LED package including at least one LED chip.

The light assembly 124 may be configured as a colored LED emitting at least one of red, green, and blue light or a white LED. The colored LED may include at least one of a red LED, a green LED, and a blue LED.

A light source included in the light assembly 124 may be a COB (chip-on board) type. The COB light source may be configured such that an LED chip as the light source is directly coupled to the substrate 122. Thus, a process can be simplified. Further, a resistance can be reduced, and hence a loss of energy resulting from heat can be reduced. Namely, power efficiency of the light assembly 124 can increase. The COB light source can provide the brighter lighting and can be implemented to be thinner and lighter than a related art.

The light guide plate 128 may be positioned on the light assembly 124. The light guide plate 128 may function to widely spread light incident from the light assembly 124. Although not shown, a surface of the light guide plate 128 adjacent to the light assembly 124 may be formed in a stepped shape. A lower surface of the light guide plate 128 may be formed in an upwardly inclined shape and may upwardly reflect light incident from the light assembly 124.

The reflective sheet 126 may be positioned at a rear surface of the light guide plate 128. The reflective sheet 126 may reflect light emitted from the light assembly 124 to the front. The reflective sheet 126 may again reflect light reflected from the light guide plate 128 to the front.

The reflective sheet 126 may include at least one of metal and metal oxide each of which is a reflection material. The reflective sheet 126 may include metal and/or metal oxide having a high reflectance, for example, at least one of aluminum (Al), silver (Ag), gold (Au), and titanium dioxide (TiO$_2$).

The reflective sheet 126 may be formed by depositing and/or coating metal or metal oxide. An ink including a metal material may be printed on the reflective sheet 126. A deposition layer may be formed on the reflective sheet 126 using a heat deposition method, an evaporation method, or a vacuum deposition method such as a sputtering method. A coating layer and/or a printing layer may be formed on the reflective sheet 126 using a printing method, a gravure coating method or a silk screen method.

A diffusion plate (not shown) may be further included on a front surface of the light guide plate 128. The diffusion plate may upwardly diffuse light emitted from the light guide plate 128.

An air gap may be positioned between the light guide plate 128 and the optical sheet 125. The air gap may serve as a buffer capable of widely spreading light emitted from the light assembly 124. A resin may be deposited on the light assembly 124 and/or the reflective sheet 126. The resin may function to diffuse light emitted from the light assembly 124.

The optical sheet 125 may be positioned at the front surface of the light guide plate 128. A rear surface of the optical sheet 125 may be adhered to the light guide plate 128, and a front surface of the optical sheet 125 may be adhered to the rear surface of the display panel 110.

The optical sheet 125 may include at least one sheet. More specifically, the optical sheet 125 may include one or more prism sheets and/or one or more diffusion sheets. A plurality of sheets included in the optical sheet 125 may be in an attachment and/or adhesion state.

The optical sheet 125 may include a plurality of sheets having different functions. For example, the optical sheet 125 may include first to third optical sheets 125*a* to 125*c*. The first optical sheet 125*a* may function as a diffusion sheet, and the second and third optical sheets 125*b* and 125*c* may function as a prism sheet. A number and/or a position of the diffusion sheets and the prism sheets may be changed. For example, the optical sheet 125 may include the first optical sheets 125*a* as the diffusion sheet and the second optical sheet 125*b* as the prism sheet.

The diffusion sheet may prevent light coming from the light guide plate 128 from being partially concentrated and may further uniformize a luminance of light. The prism sheet may concentrate light coming from the diffusion sheet and may enable light to be vertically incident on the display panel 110.

A coupling part 125*d* may be formed on at least one of edges of the optical sheet 125. The coupling part 125*d* may be formed on at least one of the first to third optical sheets 125*a* to 125*c*.

The coupling part 125*d* may be formed at an edge of a long side of the optical sheet 125. The coupling part 125*d* on a first long side and the coupling part 125*d* on a second long side may be asymmetric. For example, a number and/or a position of the coupling parts 125*d* on the first long side may be different from a number and/or a position of the coupling parts 125*d* on the second long side.

Referring to FIGS. 8 and 9, the substrate 122 and the light assembly 124 may be positioned in a direction of a lower side 110*c* of the display panel 110. The backlight unit, in which the light assembly 124 is disposed on the side of the display panel 110, may be referred to as an edge type backlight unit.

As shown in FIG. 8, the light assembly 124 may emit light in a direction from the lower side 110*c* to an upper side 110*d* of the display panel 110. Namely, light emitted from the light assembly 124 may be diffused from the lower side 110*c* to the upper side 110*d* of the display panel 110 and may enable the whole of the display panel 110 to emit light. However, the present disclosure is not limited thereto, and the light assembly 124 may be positioned on the upper side 110d of the display panel 110.

As shown in (a) of FIG. 9, the light assembly 124 may be positioned on a right side 110a of the display panel 110. However, the present disclosure is not limited thereto, and the light assembly 124 may be positioned on a left side 110b of the display panel 110.

As shown in (b) of FIG. 9, the light assembly 124 may be positioned on the lower side 110c and the upper side 110d of the display panel 110. Further, as shown in (c) of FIG. 9, the light assembly 124 may be positioned on the right side 110a and the left side 110b of the display panel 110.

As shown in (b) and (c) of FIG. 9, the backlight unit, in which the light assembly 124 is disposed on two opposite sides of the display panel 110, may be referred to as a dual type backlight unit. In case of the dual type backlight unit, even light of a weaker intensity can be easily diffused to the entire surface of the display panel 110.

As shown in (d) of FIG. 9, the light assembly 124 may be positioned on all the sides of the display panel 110. If the light assembly 124 is positioned on all the sides of the display panel 110, a backlight unit shown in (d) of FIG. 9 may diffuse light more easily than other backlight unit.

Referring to FIGS. 10 and 11, a backlight unit 120 may include an optical layer 123 including a substrate 122, at least one light assembly 124, a reflective sheet 126, and a diffusion plate 129, and an optical sheet 125 positioned at a front surface of the optical layer 123.

The substrate 122 may be configured as a plurality of straps, which is extended in the first direction and is spaced from one another at predetermined intervals in the second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB) on which at least one light assembly 124 is mounted.

The light assembly 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in the second direction.

The light assembly 124 may be a light emitting diode (LED) chip or a LED package including at least one LED chip.

The light assembly 124 may be configured as a colored LED emitting at least one of red, green, and blue light or a white LED. The colored LED may include at least one of a red LED, a green LED, and a blue LED.

Alight source included in the light assembly 124 may be a COB (chip-on board) type. The COB light source may be configured such that an LED chip as the light source is directly coupled to the substrate 122. Thus, a process can be simplified. Further, a resistance can be reduced, and hence a loss of energy resulting from heat can be reduced. Namely, power efficiency of the light assembly 124 can increase. The COB light source can provide the brighter lighting and can be implemented to be thinner and lighter than a related art.

The reflective sheet 126 may be positioned at a front surface of the substrate 122. The reflective sheet 126 may be positioned in an area excluding a formation area of the light assembly 124 of the substrate 122. Namely, the reflective sheet 126 may have a plurality of holes 235.

The reflective sheet 126 may reflect light emitted from the light assembly 124 to the front. Further, the reflective sheet 126 may again reflect light reflected from the diffusion plate 129.

The reflective sheet 126 may include at least one of metal and metal oxide each of which is a reflection material. The reflective sheet 126 may include metal and/or metal oxide having a high reflectance, for example, at least one of aluminum (Al), silver (Ag), gold (Au), and titanium dioxide ($TiO_2$).

The reflective sheet 126 may be formed by depositing and/or coating metal or metal oxide on the substrate 122. An ink including a metal material may be printed on the reflective sheet 126. A deposition layer may be formed on the reflective sheet 126 using a heat deposition method, an evaporation method, or a vacuum deposition method such as a sputtering method. A coating layer and/or a printing layer may be formed on the reflective sheet 126 using a printing method, a gravure coating method or a silk screen method.

An air gap may be positioned between the reflective sheet 126 and the diffusion plate 129. The air gap may serve as a buffer capable of widely spreading light emitted from the light assembly 124. A supporter 200 may be positioned between the reflective sheet 126 and the diffusion plate 129, so as to keep the air gap.

A resin may be deposited on the light assembly 124 and/or the reflective sheet 126. The resin may function to diffuse light emitted from the light assembly 124.

The diffusion plate 129 may upwardly diffuse light emitted from the light assembly 124.

The optical sheet 125 may be positioned at a front surface of the diffusion plate 129. A rear surface of the optical sheet 125 may be adhered to the diffusion plate 129, and a front surface of the optical sheet 125 may be adhered to a rear surface of the display panel 110.

The optical sheet 125 may include at least one sheet. More specifically, the optical sheet 125 may include one or more prism sheets and/or one or more diffusion sheets. A plurality of sheets included in the optical sheet 125 may be in an attachment and/or adhesion state.

The optical sheet 125 may include a plurality of sheets having different functions. For example, the optical sheet 125 may include first to third optical sheets 125a to 125c. The first optical sheet 125a may function as a diffusion sheet, and the second and third optical sheets 125b and 125c may function as a prism sheet. A number and/or a position of the diffusion sheets and the prism sheets may be changed. For example, the optical sheet 125 may include the first optical sheets 125a as the diffusion sheet and the second optical sheet 125b as the prism sheet.

The diffusion sheet may prevent light coming from the diffusion plate from being partially concentrated and may further uniformize a luminance of light. The prism sheet may concentrate light coming from the diffusion sheet and may enable light to be vertically incident on the display panel 110.

A coupling part 125d may be formed on at least one of edges of the optical sheet 125. The coupling part 125d may be formed on at least one of the first to third optical sheets 125a to 125c.

The coupling part 125d may be formed at an edge of a long side of the optical sheet 125. The coupling part 125d on a first long side and the coupling part 125d on a second long side may be asymmetric. For example, a number and/or a position of the coupling parts 125d on the first long side may be different from a number and/or a position of the coupling parts 125d on the second long side.

Referring to FIG. 12, the substrate 122 including a plurality of straps, which is extended in the first direction and is spaced apart from one another at predetermined intervals in the second direction perpendicular to the first direction, may be provided on the frame 130. One end of each of the plurality of substrates 122 may be connected to a wire electrode 232.

The wire electrode 232 may be extended in the second direction. The wire electrode 232 may be connected to the ends of the substrates 122 at predetermined intervals in the second direction. The substrates 122 may be electrically connected to an adaptor (not shown) through the line electrode 232.

The light assembly 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

FIGS. 13 and 14 illustrate a light source according to an embodiment of the disclosure.

As shown in FIG. 13, a light source 203 may be a COB light source. The COB light source 203 may include at least one of an emission layer 135, first and second electrodes 147 and 149, and a fluorescent layer 137.

The emission layer 135 may be positioned on the substrate 122. The emission layer 135 may emit one of red, green, and blue light. The emission layer 135 may include one of Firpic, (CF3ppy)2Ir(pic), 9, 10-di(2-naphthyl)anthracene(AND), Perylene, distyrybiphenyl, PVK, OXD-7, UGH-3(Blue), and a combination thereof.

The first and second electrodes 147 and 149 may be positioned on both sides of a lower surface of the emission layer 135. The first and second electrodes 147 and 149 may transmit an external driving signal to the emission layer 135.

The fluorescent layer 137 may cover the emission layer 135 and the first and second electrodes 147 and 149. The fluorescent layer 137 may include a fluorescent material converting light of a spectrum generated from the emission layer 135 into white light. A thickness of the emission layer 135 at an upper side of on the fluorescent layer 137 may be uniform. The fluorescent layer 137 may have a refractive index of 1.4 to 2.0.

The COB light source 203 according to the embodiment of the disclosure may be directly mounted on the substrate 122. Thus, the size of the light assembly 124 may decrease.

Because excellent heat dissipation is provided by forming the light sources 203 on the substrate 122, the light sources 203 can be driven at a high current. Hence, the number of light sources 203 required to secure the same light quantity may decrease.

Because the light sources 203 are mounted on the substrate 122, a wire bonding process may not be necessary. Hence, the manufacturing cost may be reduced due to the simplification of the manufacturing process.

As shown in FIG. 14, the light source 203 according to the embodiment of the disclosure may emit light in a first emission range EA1. Namely, the light source 203 may emit light in an area including a second emission range EA2 of the front side and third and fourth emission ranges EA3 and EA4 of both sides. Thus, the light source 203 according to the embodiment of the disclosure is different from a related art POB light source emitting light in the second emission range EA2. Namely, the light source 203 according to the embodiment of the disclosure may emit light in a wide emission range including the side.

FIG. 15 illustrates a light assembly including a light source shown in FIG. 14.

As shown in FIG. 15, a plurality of light assemblies 124 according to the embodiment of the disclosure may be disposed along the substrate 122 and to be spaced apart from one another. Each light assembly 124 may include a light source 203 and a lens 300 positioned on one side of the light source 203.

The light source 203 may be various sources emitting light. For example, the light source 203 may be a COB type LED as described above.

The lens 300 may be positioned on the light source 203. At least a portion of the light source 203 may overlap the lens 300. For example, the light source 203 may be inserted into a groove inside the lens 300. Alternatively, an area of the light source 203, from which light is substantially emitted, may be inserted into a lower side of the lens 300. For example, when the lens 300 has a leg structure, a portion of an upper side of the light source 203 may be inserted into the lower side of the lens 300.

The lens 300 may be configured to reflect a portion of light emitted from the light source 203 and refract a portion of the light. For example, the lens 300 may be a reflection-refraction lens. The light emitted from the light source 203 may be uniformly and entirely spread through the reflection in a portion of the lens 300 and/or the refraction in a portion of the lens 300.

The light source 203 inserted into the lens 300 may be adhered to the lens 300. For example, the lens 300 and the light source 203 may be attached to each other using an adhesive.

The lens 300 may correspond to each light source 203. For example, first to third lenses 300a to 300c may be respectively positioned on first to third light sources 203a to 203c.

The lens 300 may control a path of light emitted from the light source 203. Namely, the lens 300 may control the light source 203 so that light of the light source 203 is not concentrated on a specific location. In other words, the lens 300 may enable light of the light source 203 to be uniformly diffused. The lens 300 according to the embodiment of the disclosure may efficiently control a path of light of the light source 203. The lens 300 according to the embodiment of the disclosure may efficiently control side light emitted from the light source 203.

FIG. 16 illustrates a display device according to an embodiment of the disclosure.

As shown in FIG. 16, a display device 100 according to an embodiment of the disclosure may include a frame 110, a light assembly 200 disposed in at least one edge area of the frame 110, a panel 140 positioned in front of the frame 110, and a light guide plate 120 positioned between the panel 140 and the frame 110.

The frame 110 may be made of, for example, metal and may provide rigidity for the whole of the display device 100. The frame 110 may be configured in a plate shape. A seating part 112 may be formed on one side of the frame 110.

The seating part 112 may be formed on at least one side of sides of the frame 110. The seating part 112 may be formed by bending the side of the frame 110. For example, the frame 110 may be bent to the front side of the display device 100. The light assembly 200 may be positioned on the seating part 112.

The light assembly 200 may mount a light source 220 on a substrate 210. The display device 100 in which the light assembly 200 is disposed on the side of the frame 110 may be referred to as an edge type. Light emitted from the light assembly 200 may be incident on the light guide plate 120 positioned on a front side of the frame 110. The light guide plate 120 may change a path of incident light and emit the light to the entire surface of the panel 140.

The light assembly 200 may include the light source 220 generating light, a barrier rib 230 surrounding the light source 220, and a filter 240 between the light source 220 and the light guide plate 120.

The light source 220 may be a part that substantially generates light and emits light. The light source 220 may be configured as an LED or the like. The light source 220 according to the embodiment of the disclosure may include a barrier layer 223 (see FIG. 17), etc. and thus can improve optical characteristics including a color difference, etc. This will be described in detail in the corresponding paragraphs.

The barrier rib 230 may be formed around the light source 220. For example, the barrier rib 230 may function to guide so that light emitted from the light source 220 travels toward the light guide plate 120. An inner surface of the barrier rib 230 may have an inclined surface 232.

The inclined surface 232 may function to guide so that light emitted from the light source 220 travels toward the light guide plate 120. The inclined surface 232 may be inclined toward the light guide plate 120 from the substrate 210. Namely, a space inside the barrier rib 230 may become larger as it goes toward the light guide plate 120. Thus, light that travels toward the inclined surface 232 among light emitted from the light source 220 may be reflected by the inclined surface 232 and may naturally travel toward the light guide plate 120.

The filter 240 may be positioned in an opening of the barrier rib 230. In other words, the filter 240 may be positioned between the light source 220 and the light guide plate 120.

The filter 240 may have characteristics of a band pass filter (BPF). Predetermined processing needs to be performed on light emitted from the light source 220, in order to improve optical characteristics including improvement in a color reproduction rate and/or improvement in a color difference, etc. A related art applied adjustment in a fluorescence composition ratio of a light source 220 and/or an optical sheet 130 applying a light absorbing dye, in order to improve the optical characteristics. However, the related art may narrowly improve the optical characteristics through the adjustment in the fluorescence composition ratio of the light source 220 and may increase the cost and the possibility of wrinkling due to the addition of the optical sheet 130 applying the light absorbing dye. On the other hand, the display device 100 according to the embodiment of the disclosure can solve the related art problems by applying the filter 240 having the BPF characteristics. Further, the display device 100 according to the embodiment of the disclosure can improve the optical characteristics by applying the filter 240 of a unique shape. The detailed configuration of the filter 240 will be described in the corresponding paragraphs.

The panel 140 may be a part for displaying an image. The panel 140 merely displays an image, but may not emit light. Thus, light of the light assembly 200 may pass through the light guide plate 120 to illuminate the panel 140. An optical sheet 130 may be positioned between the panel 140 and the light guide plate 120. The optical sheet 130 can improve characteristics of light passing through the light guide plate 120. For example, the optical sheet 130 can improve characteristics of light so that the light, of which a path is changed by passing through the light guide plate 120, has a uniform luminance. An air gap may exist between the optical sheet 130 and the panel 140. Namely, the optical sheet 130 and the panel 140 may not be completely in close contact with each other. A guide panel 160 may function to maintain the air gap between the optical sheet 130 and the panel 140. A side cover 170 may be attached to the outside of the guide panel 160.

FIG. 17 illustrates a structure of a light source shown in FIG. 16.

As shown in FIG. 17, the light source 220 according to the embodiment of the disclosure may include a barrier layer 223 positioned around an LED 221 and a fluorescent substance 225 positioned on a surface to which light of the LED 221 is emitted.

The barrier layer 223 may be coupled to a sidewall of the LED 221. The barrier layer 223 may reflect light directed toward the side among light emitted from the LED 221. The barrier layer 223 may be made white to reflect light. The barrier layer 223 may be made white to minimize an influence of reflected light.

The barrier layer 223 may correspond to a shape of the light source 220. For example, the barrier layer 223 may include first to fourth barrier layers 223a to 223d corresponding to four sidewalls of the light source 220. The first to fourth barrier layers 223a to 223d can prevent light from being emitted toward the side of the light source 220.

The fluorescent substance 225 may be positioned on an upper side of the light source 220. In other words, the fluorescent substance 225 may be positioned on a surface which is not blocked by the barrier layer 223 and to which light L is emitted.

The fluorescent substance 225 may function to improve optical characteristics including a color difference. Namely, light emitted from the LED 221 passes through the fluorescent substance 225, and thus the optical characteristics can be improved.

FIGS. 18 to 21 illustrate configuration and operation of the light assembly shown in FIG. 16.

As shown in FIGS. 18 to 21, the light assembly 200 according to an embodiment of the disclosure can improve optical characteristics including a color reproduction rate, chromatic aberration, etc. at the relatively low cost.

As shown in FIG. 18, the light assembly 200 may be disposed on the substrate 210. For example, a plurality of light assemblies 200 may be spaced apart from one another and positioned on the substrate 210. The light assembly 200 may include the barrier rib 230 and the filter 240. Light may be emitted to the outside only through an area of the filter 240 of the light assembly 200.

The filter 240 may have various shapes. For example, a flat shape, a shape in which at least a portion is concave or convex, etc. may be used for the filter 240. The filter 240 may include a transparent material. Thus, the filter 240 can transmit light. The detailed shape of the filter 240 will be described in detail in the corresponding paragraphs.

As shown in FIG. 19, the light assembly 200 may include the light source 220 positioned inside the barrier rib 230 and the filter 240.

The barrier rib 230 may be configured to surround the light source 220. The barrier rib 230 may not expose light emitted from the light source 220 to the outside. Further, light emitted from the light source 220 may be guided toward the filter 240 due to an inclined surface 232 inside the barrier rib 230. Thus, the efficiency of the light source 220 can be increased.

The light source 220 and the filter 240 may be spaced apart from each other by a predetermined distance by the barrier rib 230. Thus, an influence of heat generated in the light source 220 can decrease. Namely, the deterioration of the filter 240 can be prevented or reduced by a separation space resulting from the barrier rib 230.

The filter 240 can improve characteristics of light emitted from the light source 220. Because the filter 240 is positioned close to the light source 220, the filter 240 can improve the optical characteristics at the relatively low cost. This can be more clearly understood compared with the related art in which the optical sheet was added to improve the optical characteristics.

The filter 240 may be configured such that at least a portion is different from other portions. For example, at least a portion of the filter 240 may be convex or concave. Due to such a shape of the filter 240, a path of light passing through the filter 240 may be changed.

As shown in FIG. 20, the filter 240 may include a plurality of layers 240a and 240b. For example, the first layer 240a and the second layer 240b may be attached.

The light source 220 (see FIG. 19) may emit light having a plurality of wavelengths. In order to improve the optical characteristics such as the color reproduction rate of the display device 100, it is necessary to illuminate the panel 140 (see FIG. 16) with light of a specific wavelength and/or a single wavelength. The filter 240 according to an embodiment of the disclosure may filter only effective wavelengths using the plurality of layers 240a and 240b. For example, the filter 240 may filter a specific wavelength by controlling at least one of a refractive index, a thickness, and the number of layers of each of the plurality of layers 240a and 240b.

Light of first and second wavelengths L1 and L2 may be incident from the light source 220 (see FIG. 19). Light may be reflected and/or transmitted between the first layer 240a and the second layer 240b, and a multiple interference phenomenon may occur. For example, light of the first wavelength L1 may experience constructive interference by a phase difference corresponding to a multiple of a wavelength, and light of the second wavelength L2 may experience destructive interference by a phase difference corresponding to one half of a wavelength. Thus, the light of the second wavelength L2 in which the destructive interference occurs cannot pass through the filter 240, and only the light of the first wavelength L1 in which the constructive interference occurs can pass through the filter 240. Namely, light passing through the filter 240 has a wavelength within a specific range.

At least one of the plurality of layers constituting the filter 240 may be made of a glass material. For example, the filter 240 may be configured such that at least one other layer is stacked on the basis of a glass layer.

As shown in FIG. 21, the display device 100 according to an embodiment of the disclosure may change a path of light passing through the filter 240.

As shown in (a) of FIG. 21, light L emitted from the light source 220 may be incident toward the light guide plate 120. In the related art, light L from a light source may be emitted in a fan shape. For example, light L from the light source 220 may be incident on the light guide plate 120 in the form of spreading by angles A1 and A2, i.e., by a total of angle A from a center line of the light source 220 in one direction and other direction, respectively. In other words, it means that an incident angle of the light L emitted from the light source 220 with respect to the light guide plate 120 varies. A traveling direction of refracted light may vary due to a variety in the incident angle of the light L, and a color difference may occur due to change in a light path. If the color difference occurs due to the change in the light path, color expression of the display device 100 may be affected.

As shown in (b) of FIG. 21, at least a portion of the filter 240 may be in a convex shape. A path of light L passing through a convex portion of the filter 240 may be changed. Namely, a path of light L that has been emitted from the light source 220 in the form of spreading by an angle A may be changed to a path parallel to the light guide plate 120. In other words, the path of the light L may be changed to a path perpendicular to an incident surface of the light guide plate 120. In other words, an incident angle to the light guide plate 120 may be changed constantly. Thus, this may be suitable for an optimized color representation of the display device 100.

FIGS. 22 to 25 illustrate the filter shown in FIG. 16.

As shown in FIGS. 22 to 25, the filter 240 according to an embodiment of the disclosure may be configured in various shapes capable of changing a light path.

As shown in FIG. 22, the filter 240 may include a first surface 241 and a second surface 243. The first surface 241 may be a surface close to the light guide plate 120 (see FIG. 16). The second surface 243 may be a surface close to the light source 220 (see FIG. 16).

The first surface 241 may be in a convex shape toward the light guide plate 120 (see FIG. 16). Thus, the filter 240 may entirely perform a function similar to a convex lens. Namely, light L emitted from a light source 230 in a fan shape or a radial shape may pass through the filter 240 and may be changed into parallel light L.

The second surface 243 may be in a different shape from the first surface 243. Namely, the shapes of the first and second surfaces 241 and 243 of the filter 240 may be different from each other. For example, the second surface 243 may be in a flat shape.

As shown in FIG. 23, the filter 240 may be configured such that at least a portion is different from at least other portion in shape.

The first surface 241 may include a flat portion F1 and a curved portion C. For example, an outer circumferential portion of the filter 240 may be the flat portion F1, and an inner side of the flat portion F may be the curved portion C. A size and/or a curved degree of the curved portion C may be related to a distance between the curved portion C and the light guide plate 120 (see FIG. 16), on which light passing through the filter 240 is incident, and/or an incident area of the light guide plate 120 (see FIG. 16).

As shown in FIG. 24, the filter 240 may be in the form of three-dimensionally processing a plate. For example, the filter 240 may be in the form of convexly processing a center portion of a circular flat plate. Thus, a void space 245 may be formed inside the filter 240.

As shown in FIG. 25, the filter 240 may be configured to cover the plurality of light assemblies 200.

As shown in (a) of FIG. 25, the plurality of light assemblies 200 may be arranged on the substrate 210.

The filter 240 may correspond to the plurality of light assemblies 200. For example, one filter 240 may change a path of light emitted from first and second light assemblies 200a and 200b, and the like.

As shown in (b) of FIG. 25, the filter 240 may be configured in a convex shape toward the first surface 241. The filter 240 may be extended in a longitudinal direction, similar to the substrate 210. Thus, the filter 240 may be configured at the lower cost than when the filter 240 corresponding to each light assembly 200 is used.

FIG. 26 illustrates a display device according to another embodiment of the disclosure.

As shown in FIG. 26, a display device 110 according to another embodiment of the disclosure may be a direct type display device 110. Namely, a light assembly 200 that provides light for the display device 100 may be disposed on a plane of a reflective sheet 126. Namely, light emitted from the light assembly 200 may be directly incident on a panel.

A filter 240 according to the embodiment of the disclosure may be coupled to the light assembly 200. For example, first to third filters 240a, 240b and 240c covering a plurality of light assemblies 200 may be positioned.

The filter 240 may improve and/or change optical characteristics of light emitted from the light assembly 200, as described above. FIG. 26 shows the filter 240 of the shape corresponding to the plurality of light assemblies 200, but it is needless to say that the filter 240 illustrated in the previous drawings may be applied.

Various types of lenses may be applied to the light assembly 200. For example, a reflective lens, a refractive lens, a reflection-refraction lens, and the like may be applied. The lens may properly distribute light emitted from the light assembly 200. For example, the lens may reflect and/or refract light generated in the light assembly 200 so that light passing through the lens has a uniform luminance.

As shown in (a) of FIG. 26, an outer surface of the lens may include first and second surfaces S1 and S3. The first surface S1 may be an upper side of the lens, and the second surface S3 may be a side of the lens. The first surface S1 may be concave toward the center of the lens. The second surface S3 may be inclined to the ground in an inside direction. Light emitted from the light assembly 200 can be prevented from being concentrated on a specific region by the first surface S1, that is concave toward the center of the lens, and the second surface S3, that is inclined in the inside direction. In particular, such a shape of the lens can be useful when side light is strong as in a LED light source.

As shown in (b) of FIG. 26, at least a portion of an outer surface of the lens may form a convex surface S. The convex surface S may cause light emitted from the light source to be refracted. For example, the convex surface S may evenly distribute upper light so that the upper light is not concentrated on a specific region.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

The invention claimed is:

1. A display device comprising:
a display panel;
a light guide plate positioned in a rear of the display panel;
a frame positioned in a rear of the display panel; and
a light assembly disposed on at least one side of the light guide plate,
wherein the light assembly includes:
a light source; and
a filter positioned at a light path between the light source and the light guide plate and changing characteristics of light emitted from the light source,
wherein an outer surface of the filter adjacent to the light guide plate has a convex shape toward the light guide plate.

2. The display device of claim 1, wherein the filter further includes:
a flat surface formed on an outer surface adjacent to the light source.

3. The display device of claim 1, wherein the filter changes characteristics of light that passes through the filter and is incident on the light guide plate, so that a path of the light is perpendicular to an incident surface of the light guide plate.

4. The display device of claim 1, wherein the light source includes a plurality of light sources spaced apart from one another, and
wherein the filter is positioned on an area corresponding to at least two of the plurality of light sources.

5. The display device of claim 1, wherein the filter includes a plurality of stacked layers.

6. The display device of claim 1, wherein the filter is a band pass filter (BPF) selectively transmitting light of a specific wavelength.

7. The display device of claim 1, wherein the light source includes a fluorescent substance positioned on a path on which light emitted from the light source is incident on the filter.

8. The display device of claim 7, wherein the light source further includes a barrier layer that is positioned on a side of the light source and reflects the light in a direction of the fluorescent substance.

9. A display device comprising:
a display panel;
a backlight unit positioned in a rear of the display panel; and
a frame positioned in a rear of the backlight unit,
wherein the backlight unit includes:
a reflective sheet; and
a light assembly providing light for the display panel through a plurality of coupling holes formed in the reflective sheet,
wherein the light assembly includes:
a light source; and
a filter positioned on a light path between the light source and the display panel and changing characteristics of light emitted from the light source,
wherein an outer surface of the filter adjacent to the light guide plate has a convex shape toward the light guide plate.

10. The display device of claim 9, wherein the filter further includes:
a flat surface formed on an outer surface adjacent to the light source.

11. The display device of claim 9, wherein the filter changes characteristics of light that passes through the filter and is incident on the display panel, so that a path of the light is perpendicular to an incident surface of the display panel.

12. The display device of claim 9, wherein the light source includes a plurality of light sources spaced apart from one another, and
wherein the filter is positioned on an area corresponding to at least two of the plurality of light sources.

13. The display device of claim 9, wherein the filter includes a plurality of stacked layers.

14. The display device of claim 9, wherein the filter is a band pass filter (BPF) selectively transmitting light of a specific wavelength.

15. The display device of claim 9, wherein the light source includes a fluorescent substance positioned on a path on which light emitted from the light source is incident on the filter.

16. The display device of claim 15, wherein the light source further includes a barrier layer that is positioned on a side of the light source and reflects the light in a direction of the fluorescent substance.

* * * * *